(12) United States Patent
Abraham

(10) Patent No.: US 10,999,163 B2
(45) Date of Patent: May 4, 2021

(54) MULTI-CLOUD VIRTUAL COMPUTING ENVIRONMENT PROVISIONING USING A HIGH-LEVEL TOPOLOGY DESCRIPTION

(71) Applicant: Juniper Networks, Inc., Sunnyvale, CA (US)

(72) Inventor: Sanju C. Abraham, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 82 days.

(21) Appl. No.: 16/132,209

(22) Filed: Sep. 14, 2018

(65) Prior Publication Data

US 2020/0059420 A1    Feb. 20, 2020

Related U.S. Application Data

(60) Provisional application No. 62/718,869, filed on Aug. 14, 2018.

(51) Int. Cl.
*G06F 15/16* (2006.01)
*H04L 12/24* (2006.01)
(Continued)

(52) U.S. Cl.
CPC ............ *H04L 41/5054* (2013.01); *G06F 8/60* (2013.01); *G06F 9/45558* (2013.01);
(Continued)

(58) Field of Classification Search
CPC ... H04L 41/5054; H04L 67/1089; G06F 8/60; G06F 9/45558; G06F 9/5077; G06F 2009/4557
See application file for complete search history.

(56) References Cited

U.S. PATENT DOCUMENTS 9,621,428 B1 * 4/2017 Lev ........................ H04L 41/12
9,641,435 B1   5/2017 Sivaramakrishnan
(Continued)

FOREIGN PATENT DOCUMENTS

WO    2013184846 A1    12/2013

OTHER PUBLICATIONS

TOSCA simple profile in YAML Version 1.1, Jan. 12, 2017, Matt Rutkowski & Luc Boutier, OASIS. pp. 196 & 197 (Year: 2017).*

(Continued)

*Primary Examiner* — Douglas B Blair
(74) *Attorney, Agent, or Firm* — Shumaker & Sieffert, P.A.

(57) ABSTRACT

In one example, a method may include obtaining, by a computing device, a high-level topology description for a virtual computing environment to be provisioned in a plurality of computing infrastructures. Each of the computing infrastructures may be implemented using a different computing architecture and deployed by a different provider. The example method may further include transforming, by a rules engine executing on the computing device, the high-level topology description to respective templates for the computing infrastructures that each describes a topology for a virtual computing environment in a format that conforms to a schema that can be processed by a corresponding one of the computing infrastructures to implement the virtual computing environment in the corresponding one of the computing infrastructures, and outputting the templates for configuring the computing infrastructures.

20 Claims, 12 Drawing Sheets

(51) Int. Cl.
*G06F 8/60* (2018.01)
*G06F 9/455* (2018.01)
*G06F 9/50* (2006.01)

(52) U.S. Cl.
CPC ........ *G06F 9/5077* (2013.01); *H04L 41/0843* (2013.01); *H04L 41/12* (2013.01); *G06F 2009/45562* (2013.01)

(56) References Cited

U.S. PATENT DOCUMENTS

| | | | | |
|---|---|---|---|---|
| 10,838,747 | B2* | 11/2020 | Easterling | G06F 9/45541 |
| 2013/0145367 | A1* | 6/2013 | Moss | H04L 41/0896 718/1 |
| 2015/0180949 | A1 | 6/2015 | Maes et al. | |
| 2015/0341240 | A1* | 11/2015 | Iyoob | H04L 43/08 709/201 |
| 2016/0105488 | A1* | 4/2016 | Thakkar | H04L 67/34 709/217 |
| 2017/0041189 | A1* | 2/2017 | Aswathanarayana | H04L 41/0806 |
| 2017/0289060 | A1* | 10/2017 | Aftab | H04L 67/1097 |
| 2018/0115551 | A1* | 4/2018 | Cole | H04L 41/18 |
| 2018/0276060 | A1* | 9/2018 | Arumugam | H04L 41/0893 |
| 2018/0300116 | A1* | 10/2018 | Meytin | G06F 8/60 |
| 2019/0026085 | A1* | 1/2019 | Bijani | G06F 8/60 |
| 2019/0079751 | A1* | 3/2019 | Foskett | G06F 9/5072 |
| 2019/0095230 | A1* | 3/2019 | Glessner | G06F 21/57 |
| 2019/0122156 | A1* | 4/2019 | Asthana | G06Q 10/06313 |
| 2019/0138288 | A1* | 5/2019 | Brealey | G06F 8/65 |
| 2020/0004589 | A1* | 1/2020 | Geiger | H04L 41/0823 |
| 2020/0387357 | A1* | 12/2020 | Mathon | G06F 9/5077 |

OTHER PUBLICATIONS

"Contrail Enterprise Multicloud," Juniper Networks, Inc., 5 pp, Jun. 15, 2018.

"CacheControl/json-rules-engine," Github, https://github.com/CacheControl/json-rules-engine/blob/master/docs/rules.md, Jan. 15, 2018, 6 pp.

Extended Search Report from counterpart European Application No. 19183176.7, dated Jan. 16, 2020, 11 pp.

Guillen et al., "A service-oriented framework for developing cross cloud migratable software," the Journal of Systems and Software, vol. 86, Available online Jan. 3, 2013, 15 pp.

Response to Extended Search Report dated Jan. 16, 2020, from counterpart European Application No. 19183176.7, filed Aug. 17, 2020, 19 pp.

* cited by examiner

MULTI-CLOUD VIRTUAL COMPUTING ENVIRONMENT PROVISIONING USING A HIGH-LEVEL TOPOLOGY DESCRIPTION

This application claims the benefit of U.S. Provisional Patent Application No. 62/718,869, filed on Aug. 14, 2018, the entire content of which is incorporated herein by reference.

TECHNICAL FIELD

This disclosure relates to computing infrastructure virtualization and, more specifically, to provisioning virtual computing environments in a computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtual machines are a virtualization scheme based on machine-level virtualization. Virtual machines include a guest operating system that runs on a hypervisor of the host computing device to emulate the hardware of a computer to provide a new computer environment for executing applications.

Containerization is a virtualization scheme based on operation system-level virtualization. Containers are lightweight and portable execution environments for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same cloud environment, with communication enabled among the diverse deployments of applications. The container network should also be agnostic to work with the multiple types of orchestration platforms that are used to deploy containerized applications.

A cloud computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtualized environments, such as containers or VMs, as well as among applications running on legacy (e.g., physical) environments. Software-defined networking contributes to network management.

SUMMARY

This disclosure describes techniques for enabling provisioning of a multi-cloud virtual computing environment using a high-level topology description of the multi-cloud virtual computing environment distributed across multiple different computing infrastructures. For example, a topology file defines the desired multi-cloud virtual computing environment using high-level semantics and syntax that encodes projects made up of instances of network and computing devices and defines connectivity and relationships among the instances. The multi-cloud virtual computing environment may span multiple different computing infrastructures, which correspond to different computing infrastructures that each host one or more projects of the multi-cloud virtual computing environment. The one or more projects may comprise any combination of applications, tenants, organizations, or the like. A computing infrastructure may be a virtualized computing infrastructure in the form of a public or private cloud, or a bare metal server system infrastructure, for example. Each project of the multi-cloud virtual computing environment is itself a virtual computing environment within a single computing infrastructure and makes up a part of the overall multi-cloud virtual computing environment to be provisioned in the multiple different computing infrastructures.

A transformer may parse the topology file to obtain virtual computing infrastructure details from an operator comprising a network, one or more storage devices, and compute resources including the instances and then apply a rules database to create a set of templates for the multi-cloud topology. Each template of the set of templates may define a desired virtual computing environment to be provisioned within a different one of a set of multiple computing infrastructures. A controller may apply each template in the set of templates to the corresponding computing infrastructure to provision one or more projects defined in the template that conforms to a computing infrastructure topology schema for the corresponding computing infrastructure. After the desired virtual computing environment has been implemented by the controller, the controller may distribute virtual machines or other virtual execution elements for executing applications using the multi-cloud virtual computing environment.

In some examples, in addition to applying a desired computing infrastructure to a data center, the controller may be configured to observe a current state of computing infrastructure of the data center. For example, the controller may observe a first infrastructure in an example data center. Additionally, the controller may compare the first infrastructure to a second infrastructure representing a desired computing infrastructure for the example data center. The transformer may create instructions (i.e., at least one template)

that when exported by the controller will transform the first infrastructure into the second infrastructure. As such, the controller may be configured to dictate a desired infrastructure across a plurality of computing infrastructures.

The techniques may provide one or more technical advantages. In general, computing infrastructure may vary across platforms. More specifically, instructions for building and maintaining computing infrastructure may vary across public clouds and private clouds. The techniques may enable application developers to define, using a topology file having a definition that conforms to a high-level description schema, a complete multi-cloud virtual computing environment for one or more applications. The controller having a transformer as described herein may transform the topology file to corresponding templates for provisioning the corresponding computing infrastructures, thereby enabling the developers to express an intended multi-cloud topology without having to separate create templates for each project within a different computing infrastructure. For example, the controller may use a first template to build and maintain computing infrastructure in a first data center operated by a first provider. Additionally, the controller may use a second template to build and maintain computing infrastructure in a second data center operated by a second provider. Automatically creating each template needed for each computing infrastructure based on an intended multi-cloud topology expressed using a high-level language, such as YAML Ain't Markup Language (YAML), may reduce the time to provision the topology and permit, at least in some cases, zero-touch provisioning.

In one example, a method includes obtaining, by a computing device, a high-level topology description for a virtual computing environment to be provisioned in a plurality of computing infrastructures, where each of the computing infrastructures is implemented using a different computing architecture and deployed by a different provider; transforming, by a rules engine executing on the computing device, the high-level topology description to respective templates for the computing infrastructures that each describes a topology for a virtual computing environment in a format that conforms to a schema that can be processed by a corresponding one of the computing infrastructures to implement the virtual computing environment in the corresponding one of the computing infrastructures; and outputting the templates for configuring the computing infrastructures.

As another example, a computing system includes one or more processors coupled to a memory, where the one or more processors are configured to obtain a high-level topology description for a virtual computing environment to be provisioned in a plurality of computing infrastructures, where each of the computing infrastructures is implemented using a different computing architecture and deployed by a different provider; transform the high-level topology description to respective templates for the computing infrastructures that each describes a topology for a virtual computing environment in a format that conforms to a schema that can be processed by a corresponding one of the computing infrastructures to implement the virtual computing environment in the corresponding one of the computing infrastructures; and output the templates for configuring the computing infrastructures.

As another example, a non-transitory computer medium includes instructions for causing one or more processors to obtain a high-level topology description for a virtual computing environment to be provisioned in a plurality of computing infrastructures, where each of the computing infrastructures is implemented using a different computing architecture and deployed by a different provider; transform the high-level topology description to respective templates for the computing infrastructures that each describes a topology for a virtual computing environment in a format that conforms to a schema that can be processed by a corresponding one of the computing infrastructures to implement the virtual computing environment in the corresponding one of the computing infrastructures; and output the templates for configuring the computing infrastructures.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Like reference characters denote like elements throughout the figures and text.

DETAILED DESCRIPTION

Figure 1:
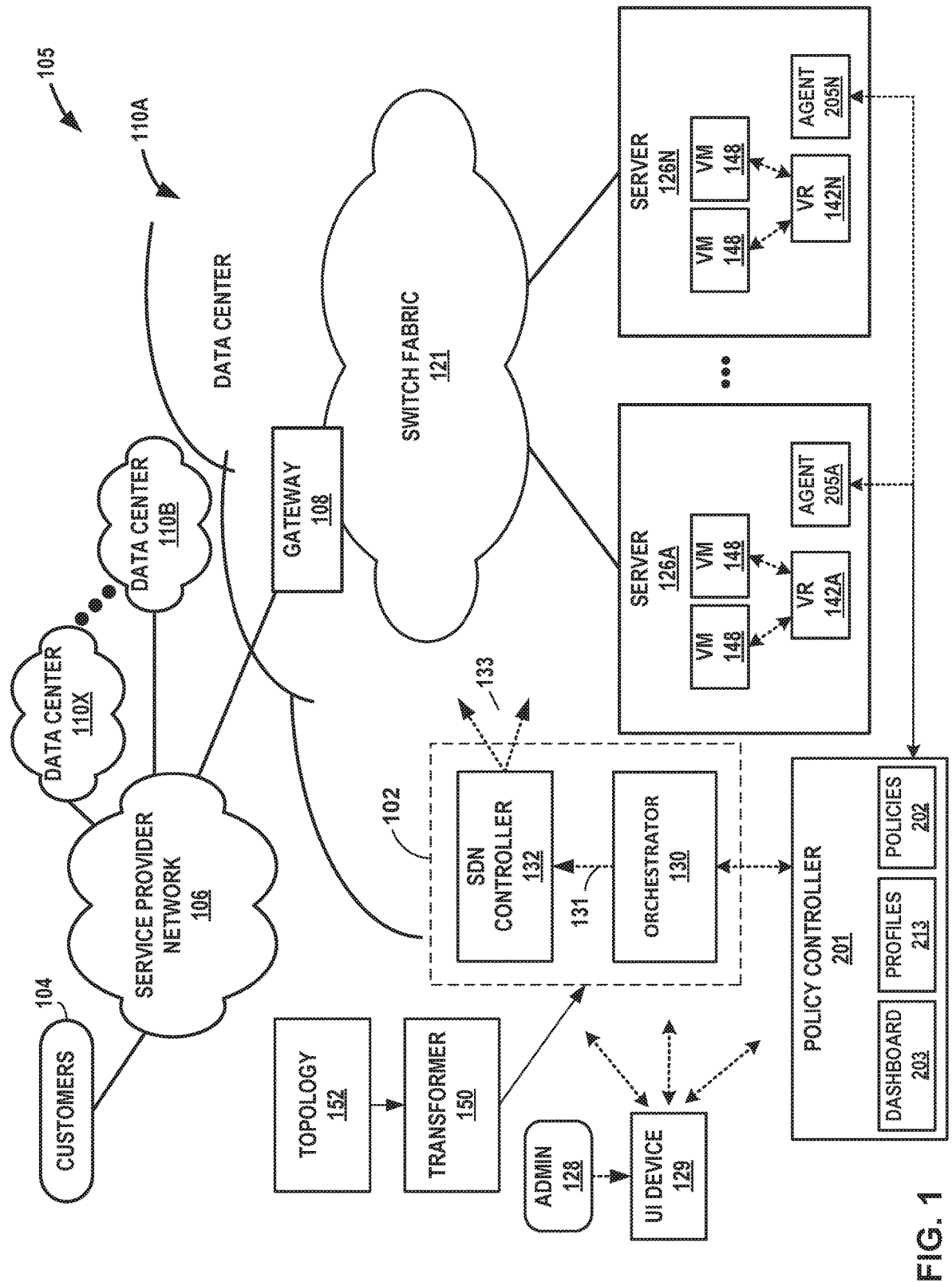
FIG. 1 is a conceptual diagram illustrating an example network that includes an example data center in which performance and usage metrics for infrastructure elements for cloud-based computing environments are monitored, and optionally including internal processor metrics relating to resources shared by multiple processes, in accordance with one or more aspects of the present disclosure.

FIG. 1 is a conceptual diagram illustrating an example network 105 that includes an example data center 110A in which performance and usage metrics for infrastructure elements for cloud-based computing environments are monitored, and optionally including internal processor metrics relating to resources shared by multiple processes, in accordance with one or more aspects of the present disclosure. FIG. 1 illustrates one example implementation of network 105 and data center 110A that hosts one or more cloud-based computing networks, computing domains or projects, generally referred to herein as cloud computing clusters. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110A may be appropriate in other instances. Such implementations may include a subset of the components included in the example of FIG. 1 and/or may include additional components not shown in FIG. 1. Data center 110A may be an example data center of data centers 110A-110X (collectively, "data centers 110").

Each of data centers 110 may represent a different computing infrastructure, such as a public, private, or hybrid cloud, or a bare metal server system infrastructure. The different computing infrastructures may be implemented using different computing platforms and technologies such that a configuration for one data center 110A is not workable with a different data center 110B. Example public cloud infrastructures include Microsoft Azure, Google Compute Platform, and Amazon Web Services. Any one or more of data centers 110 may also represent an on-premises computing infrastructure for an enterprise or other entity.

Data centers 110 may be interconnected with one another and with customer networks associated with customers 104 via a service provider network 106. In general, each data center 110 provides an operating environment for applications and services for customers 104 coupled to the data center by service provider network 106. Data centers 110 may, for example, host infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, each data center 110 may represent one of many geographically distributed network data centers. As illustrated in the example of FIG. 1, each of data centers 110 may represent a facility that provides network services for customers 104. Customers 104 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 110 may be individual network servers, network peers, or otherwise.

In this example, each of data centers 110 includes a set of storage systems and application servers 126A-126N (herein, "servers 126") interconnected via high-speed switch fabric 121 provided by one or more tiers of physical network switches and routers. Switch fabric 121 is provided by a set of interconnected top-of-rack (TOR) switches (not shown) coupled to a distribution layer of chassis switches (not shown). Although not shown, each of data centers 110 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, data center 110A provides an operating environment for applications and services for customers 104 coupled to data center 110A by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110A hosts infrastructure equipment, such as networking and storage systems, redundant power supplies, and environmental controls. Service provider network 106 may be coupled to one or more networks administered by one or more providers and may thus form part of a large-scale public network infrastructure, e.g., the Internet.

In some examples, data center 110A may represent one of many geographically distributed network data centers. As illustrated in the example of FIG. 1, data center 110A is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110A is an individual network server, a network peer, or otherwise.

In the example of FIG. 1, data center 110A includes a set of storage systems and application servers, including server servers 126 interconnected via high-speed switch fabric 121 provided by one or more tiers of physical network switches and routers. Servers 126 function as physical compute nodes of the data center. For example, each of servers 126 may provide an operating environment for execution of one or more customer-specific virtual machines 148 ("VMs" in FIG. 1) or other virtualized instances, such as containers. Each of servers 126 may be alternatively referred to as a host computing device or, more simply, as a host. A server 126 may execute one or more virtualized instances, such as virtual machines, containers, or other virtual execution environment/element for running one or more services, such as virtualized network functions (VNFs). Servers 126 may additionally, or alternatively, host containerized applications using containers.

Although not shown, switch fabric 121 may include top-of-rack (TOR) switches coupled to a distribution layer of chassis switches, and data center 110A may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110A and customers 104 by service provider network 106. Gateway 108 acts to forward and receive packets between switch fabric 121 and service provider network 106.

Software-Defined Networking ("SDN") controller 132 provides a logically and in some cases physically centralized controller for facilitating operation of one or more virtual networks within data center 110A in accordance with one or more examples of this disclosure. The terms SDN controller and Virtual Network Controller ("VNC") may be used interchangeably throughout this disclosure. In some examples, SDN controller 132 operates in response to configuration input received from orchestrator 130 via northbound API 131, which in turn operates in response to configuration input received from an administrator 128 interacting with and/or operating user interface device 129. Additional information regarding SDN controller 132 operating in conjunction with other devices of data center 110A or other software-defined network is found in International Application Number PCT/US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable device for interacting presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than policy controller 201. In such examples, user interface device 129 may communicate with policy controller 201 over a network or other means of communication. In other examples, user interface device 129 may be a local peripheral of policy controller 201, or may be integrated into policy controller 201.

In some examples, orchestrator 130 manages functions of data center 110A such as compute, storage, networking, and application resources. For example, orchestrator 130 may create a virtual network for a tenant within data center 110A or across data centers. Orchestrator 130 may attach virtual machines (VMs) to a tenant's virtual network. Orchestrator 130 may connect a tenant's virtual network to an external network, e.g. the Internet or a VPN. Orchestrator 130 may implement a security policy across a group of VMs or to the boundary of a tenant's network. Orchestrator 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestrator 130. For example, SDN controller 132 implements high-level requests from orchestrator 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Typically, the traffic between any two network devices, such as between network devices (not shown) within switch fabric 121 or between servers 126 and customers 104 or between servers 126, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Virtual routers 142 (virtual router 142A to virtual router 142N, collectively "virtual routers 142" in FIG. 1) execute multiple routing instances for corresponding virtual networks within data center 110A and routes the packets to appropriate virtual machines executing within the operating environment provided by servers 126. Each of servers 126 may include a virtual router. Packets received by virtual router 142A of server 126A, for instance, from the underlying physical network fabric may include an outer header to allow the physical network fabric to tunnel the payload or "inner packet" to a physical network address for a network interface of server 126A. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In some aspects, the virtual router buffers and aggregates multiple tunneled packets received from the underlying physical network fabric prior to delivery to the appropriate routing instance for the packets. That is, a virtual router executing on one of servers 126 may receive inbound tunnel packets of a packet flow from one or more TOR switches within switch fabric 121 and, prior to routing the tunnel packets to a locally executing virtual machine, process the tunnel packets to construct a single, aggregate tunnel packet for forwarding to the virtual machine. That is, the virtual router may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by the virtual router to the virtual machine as if a single inbound tunnel packet was received from the virtual network. Moreover, to perform the aggregation operation, the virtual router may leverage a kernel-based offload engine that seamlessly and automatically directs the aggregation of tunnel packets. Further example techniques by which the virtual routers forward traffic to the customer-specific virtual machines executing on servers 126 are described in U.S. patent application Ser. No. 14/228,844, entitled "PACKET SEGMENTATION OFFLOAD FOR VIRTUAL NETWORKS," incorporated herein by reference.

In some example implementations, virtual routers 142 executing on servers 126 steer received inbound tunnel packets among multiple processor cores to facilitate packet processing load balancing among the cores when processing the packets for routing to one or more virtual and/or physical machines. As one example, server 126A includes multiple network interface cards and multiple processor cores to execute virtual router 142A and steers received packets among multiple processor cores to facilitate packet processing load balancing among the cores. For instance, a particular network interface card of server 126A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

Topology 152 represents a high-level, intent-based description of a topology (e.g., an arrangement of nodes, virtual networks, etc.) for a virtual computing environment. In some examples, topology 152 is written in a human-readable data serialization language, e.g., YAML Ain't Markup Language (YAML) or JavaScript Object Notation (JSON). Topology 152 may include a plurality of projects each having one or more instances of devices and that, when applied to data centers 110, may configure the computing infrastructure of data centers 110 with the project to provision a multi-cloud virtual computing environment that may span multiple different computing infrastructures included in data centers 110. As described herein, computing infrastructure includes network infrastructure.

Transformer 150 may convert topology 152 into a set of instructions that, once executed by controller 102, will build and modify the plurality of virtualized infrastructures in data centers 110. In some examples, topology 152 may be created based on input from a GUI (not pictured). In other examples, topology 152 may be generated automatically by a controller 102 executing in data center 110A or external to any of data centers 110. Topology 152 may include lists that differ based on a defined provider. Depending on the defined provider, different data structures and parameters may be included. Topology 152 may include IP addresses that identify nodes within the desired virtual computing environment. As such, topology 152 may determine the virtual computing environment by specifying IP addresses corresponding to nodes within the network. Transformer 150 may include one or more Application Programming Interfaces (APIs). APIs may define an interface through which transformer 150 interacts with topology 152. Transformer 150 may be configured to "pull" data from topology 152 using APIs.

Additionally, transformer 150 may parse the human-readable language of topology 152 and determine an organizational hierarchy of infrastructure elements as indicated by topology 152. In parsing topology 152, transformer 150 may employ linguistic parsing techniques. Transformer 150 may use a plurality of rules to govern the conversion of topology 152 into instructions for directing controller 102 to build and monitor infrastructure of data centers 110. In some examples, transformer 150 may use the plurality of rules to determine an identity of a data center 110 such that transformer 150 may create a template including objects corresponding to each data center 110. By identifying a data center 110 associated with each object, transformer 150 may apply each object of topology 152 to the correct data center of data centers 110.

Network 105 may enable controller 102 to create a scalable multi-cloud architecture that provides a framework that allows to consume computing resources wherever it is located—Orchestrating Network and Security End-to-End. Additionally, network 105 may enable consistent policy enforcement across the global estate. For example, policy enforcement may be consistent and managed centrally for physical, virtual, container and cloud infrastructures. Processes performed by network 105 may be available and automated. In some cases, availability and redundancy may be preserved or enhanced via automation to decrease human error in creating and maintaining computing infrastructures. Moreover, building and maintaining computing infrastructures using transformer 150 of network 105 may enable creation of a multi-tenant environment with macro and micro segments. For example, network 105 may create or ingest Zones/Tags/Namespaces to restrict movement between environments. The techniques may improve granularity and visibility. For example network 105 may be able to provide granularity and full visibility and interaction between physical and virtual (underlay and overlay).

Multi cloud networking and fabric techniques, such as techniques described herein, may provide a set of networking and security features across hybrid cloud environments. For example, topology 152 and transformer 150 of network 105 may use automated provisioning, management, monitoring and analytics to enable seamless extension of computing, networking, and policy services across private, public and bare metal systems. Secure network extensions to the public cloud may be provided and orchestrated using a multi-cloud gateway.

In the example of FIG. 1, data center 110A further includes a policy controller 201 that provides monitoring, scheduling, and performance management for data center 110A. Policy controller 201 interacts with monitoring agents 205 that are deployed within at least some of the respective physical servers 216 for monitoring resource usage of the physical compute nodes as well as any virtualized host, such as VM 148, executing on the physical host. In this way, monitoring agents 205 provide distributed mechanisms for collecting a wide variety of usage metrics as well as for local enforcement of policies installed by policy controller 201. In example implementations, monitoring agents 205 run on the lowest level "compute nodes" of the infrastructure of data center 110A that provide computational resources to execute application workload. A compute node may, for example, be a bare-metal host of server 126, a virtual machine 148, a container or the like.

In some examples, policy controller 201 may be configured to determine and/or identify elements in the form of the virtual machines, containers, services, and/or applications executing on each of servers 126. As used herein, a resource generally refers to a consumable component of the virtualization infrastructure, i.e., a component that is used by the infrastructure, such as CPUs, memory, disk, disk I/O, network I/O, virtual CPUs, and Contrail vRouters. A resource may have one or more characteristics each associated with a metric that is analyzed by the policy agent 205 (and/or policy controller 201) and optionally reported. Lists of example raw metrics for resources are described below with respect to FIG. 2.

In general, an infrastructure element, also referred to herein as an element, is a component of the infrastructure that includes or consumes consumable resources in order to operate. Example elements include hosts, physical or virtual network devices, instances (e.g., virtual machines, containers, or other virtual operating environment instances), aggregates, projects, and services. In some cases, an element may be a resource for another element. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110A. Such nodes may be OpenStack infrastructure service nodes or Kubernetes master nodes, and/or may be implemented as virtual machines. In some examples, policy controller 201 may have network connectivity to some or all other compute nodes within data center 110A, and may also have network connectivity to other infrastructure services that manage data center 110A.

One or more policies 202 may include instructions to cause one or more policy agents 205 to monitor one or more metrics associated with servers 126. One or more policies 202 may include instructions to cause one or more policy agents 205 to analyze one or more metrics associated with servers 126 to determine whether the conditions of a rule are met. One or more policies 202 may alternatively, or in addition, include instructions to cause policy agents 205 to report one or more metrics to policy controller 201, including whether those metrics satisfy the conditions of a rule associated with one or more policies 202. The reported information may include raw data, summary data, and sampling data as specified or required by one or more policies 202.

Various components, functional units, and/or modules illustrated in FIG. 1 (e.g., user interface device 129, orchestrator 130, SDN controller 132, and policy controller 201, policy agent 205) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 2:
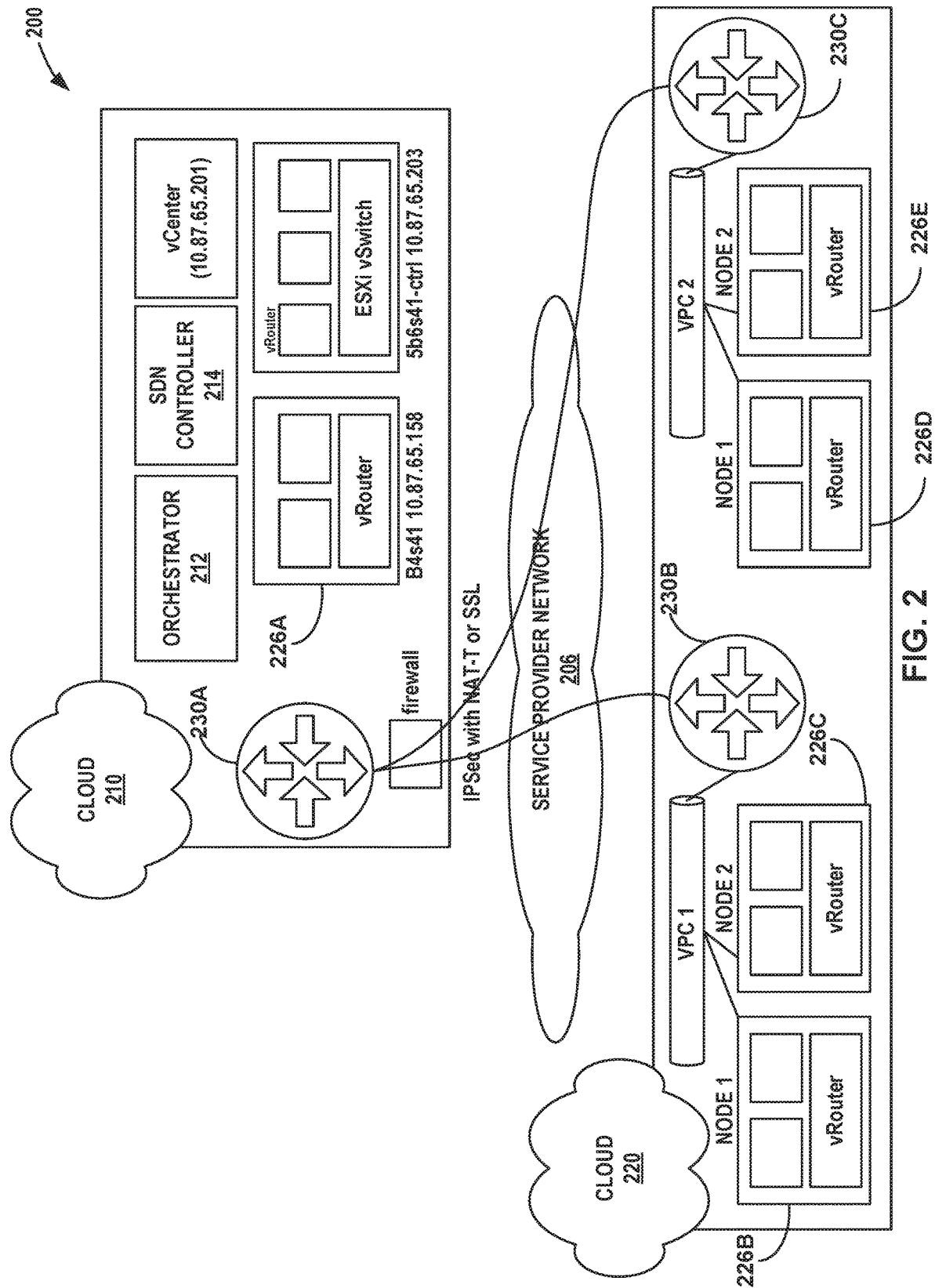
FIG. 2 is a block diagram illustrating an example network including a controller for directing information within network, according to techniques described in this disclosure.

FIG. 2 is a block diagram illustrating an example network 200 including a controller 214 for directing information within network 200, according to techniques described in this disclosure. Service provider network 206 may be an example of service provider network 106 of FIG. 1. Cloud 210 may be an example of data center 110A of FIG. 1. Orchestrator 212 may be an example of orchestrator 130 of FIG. 1. Controller 214 may be an example of controller 132 of FIG. 1. Controller 132 and orchestrator 212 may implement an overall controller, such as controller 102 of FIG. 1. Cloud 220 may be an example of any one of data centers 110B-110X of FIG. 1.

Controller 212 provides a logically and in some cases physically centralized controller for facilitating operation of one or more virtual networks within each of cloud 210 and cloud 220, such as VPC 1 of cloud 220, in accordance with one or more embodiments of this disclosure. In some examples, controller 212 may operate in response to configuration input received from a transformer (e.g., transformer 150 of FIG. 1).

In some examples, orchestrator 212 manages functions of cloud 210 such as compute, storage, networking, and application resources. For example, orchestrator 212 may create a virtual network for a tenant within cloud 210 or across data centers. Orchestrator 212 may attach virtual machines (VMs) to a tenant's virtual network. Orchestrator 212 may connect a tenant's virtual network to an external network, e.g. the service provider network 206 or cloud 220. Orchestrator 212 may implement a security policy across a group of VMs or to the boundary of a tenant's network. Orchestrator 212 may deploy a network service (e.g. a load balancer) in a tenant's virtual network. In some examples, controller 214 maintains routing, networking, and configuration information within a state database. In some examples, orchestrator 212 uses Kubernetes for automating deployment, scaling, and management of containerized applications. For example, orchestrator 212 may use Kubernetes to deploy containers to any one of servers 226A-226E (collectively, "servers 226") via controller 214. In some examples, the containers may include Docker containers. Orchestrator 212 may output instructions to controller 214 to deploy containers to servers 226 via gateway 230.

Groups of servers 226 (e.g., server 226B and 226C) may be interconnected via a high-speed switch fabric (not shown) provided by one or more tiers of physical network switches and routers. The switch fabric is provided by a set of interconnected top-of-rack (TOR) switches (not shown) coupled to a distribution layer of chassis switches (not shown). Although not shown, each of cloud 210 and cloud 220 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each server of servers 226 may include at least one virtual router and at least one container or virtual machine.

Gateway 230A-230C (collectively, "gateway 230") may provide virtual private network (VPN) services for providing connectivity over a wide area network (WAN). Tenant isolation may be performed for a tenant application workload using a standards based VPN. Gateway 230 may provide the same security posture for each data center 110A using a security policy framework. Additionally, gateway 230 may provide resiliency across availability zones in public and private cloud environments. Gateway 230 may be configured for role-based access control (RBAC) and integration with active directory/lightweight directory access protocol (AD/LDAP). In some examples, Gateway 230 may enable controller 202 to transport packets, including containers, between one or more data centers. Gateway 230 may use an encrypted connection (e.g., IPSec with Nat-t or SSL) to exchange information between gateway portals 230A, 230B, and 230C.

Figure 3:
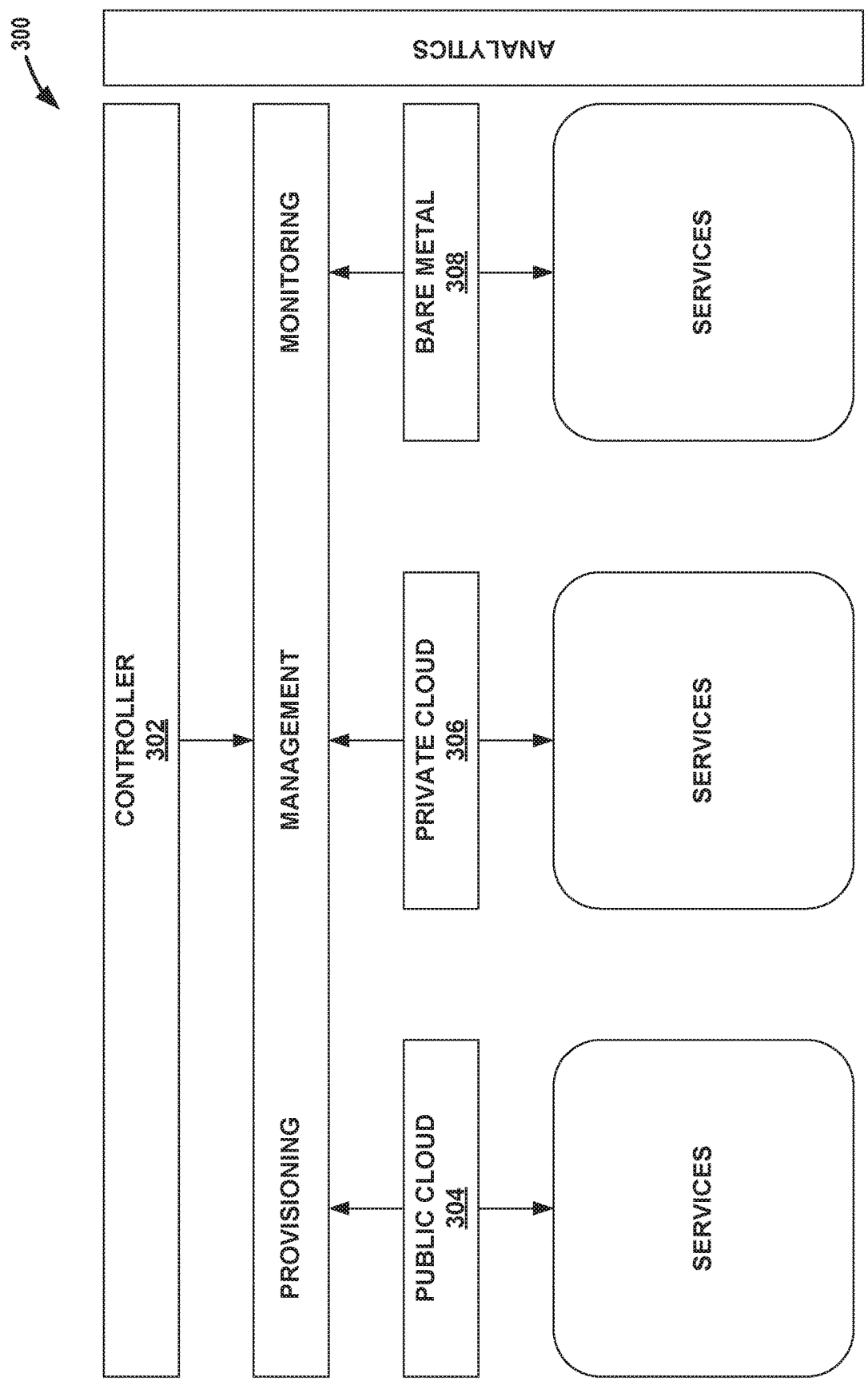
FIG. 3 is a block diagram illustrating another example network including a controller, a public cloud, a private cloud, and a bare-metal server system, according to techniques described in this disclosure.

FIG. 3 is a block diagram illustrating an example multi-cloud computing infrastructure 300 including a controller 302, a public cloud 304, a private cloud 306, and a bare-metal server system 308, according to techniques described in this disclosure. In some examples, controller 302 may provision the public cloud 304, the private cloud 306, and the bare-metal server system 308 by mapping software to respective nodes. Provisioning includes a process of preparing and equipping a network, thus allowing the network to provide new services. For example, the provisioning may include using controller 302 to deploy containers to nodes of any one of the public cloud 304, the private cloud 306, and the bare-metal server system 308. Additionally, the provisioning may include using controller 302 to enable security (e.g., activate or program firewalls) on of any one of the public cloud 304, the private cloud 306, and the bare-metal server system 308. Additionally, controller 302 may monitor and manage each of the public cloud 304, the private cloud 306, and the bare-metal server system 308. For example, if the network 300 receives instructions to perform a new task, controller 302 may provision network 300 to perform the new task by deploying new software and creating new infrastructure configurations in at least one of the public cloud 304, the private cloud 306, and the bare-metal server system 308. Controller 302 may represent an example instance of controller 102 of FIG. 1.

Figure 4:
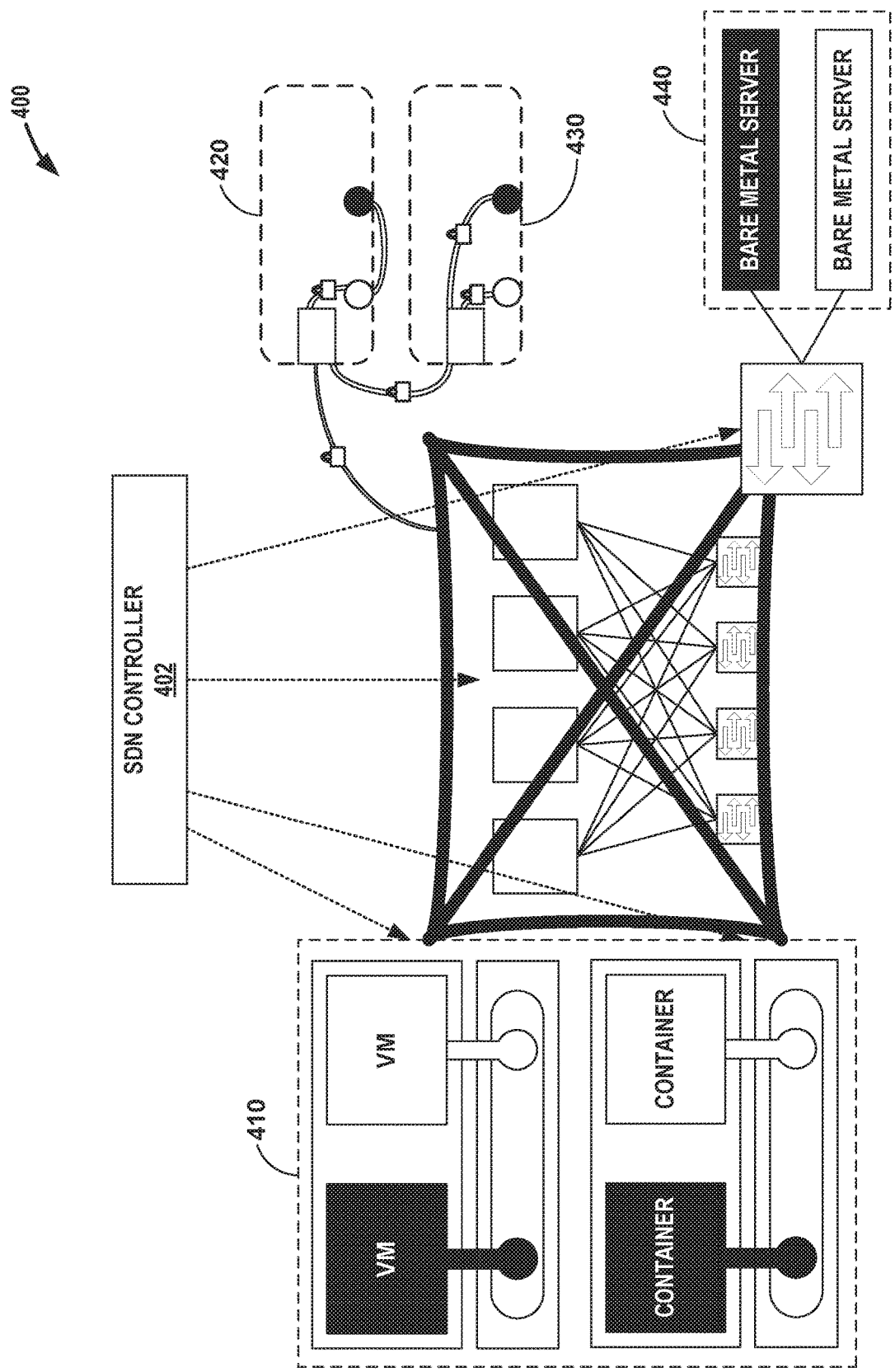
FIG. 4 is a conceptual diagram illustrating another example multi-cloud computing infrastructure managed using a controller, according to techniques described in this disclosure.

FIG. 4 is a conceptual diagram illustrating another example multi-cloud computing infrastructure 400 managed using a controller, according to techniques described in this disclosure. Controller 402 of network 400 may deploy software to data centers including server 410, VPC 420, VPC 430, and bare-metal server system 440. Server 410 may include one or more virtual machines and one or more containers. Additionally, VPC 420, VPC 430, and bare-metal server system 440 may include one or more virtual machines and one or more containers. In some examples, Controller 402 may deploy containers to build computing infrastructures in the data centers. Controller 402 may receive instructions from a transformer (not pictured). The instructions may be indicative of data (e.g., containers, objects, applications, or the like) to be deployed to each respective data center to achieve a desired virtual computing environment. Additionally, the data centers may output information indicative of a current state of network structure to controller 402. The transformer may be configured to use the current state of the virtual computing environment output by the data centers and the desired state of the virtual computing environment to produce templates. The templates may be applied by controller 400 to build the plurality of computing infrastructures of the data centers. Controller 402 may represent an example instance of controller 102 of FIG. 1.

Figure 5:
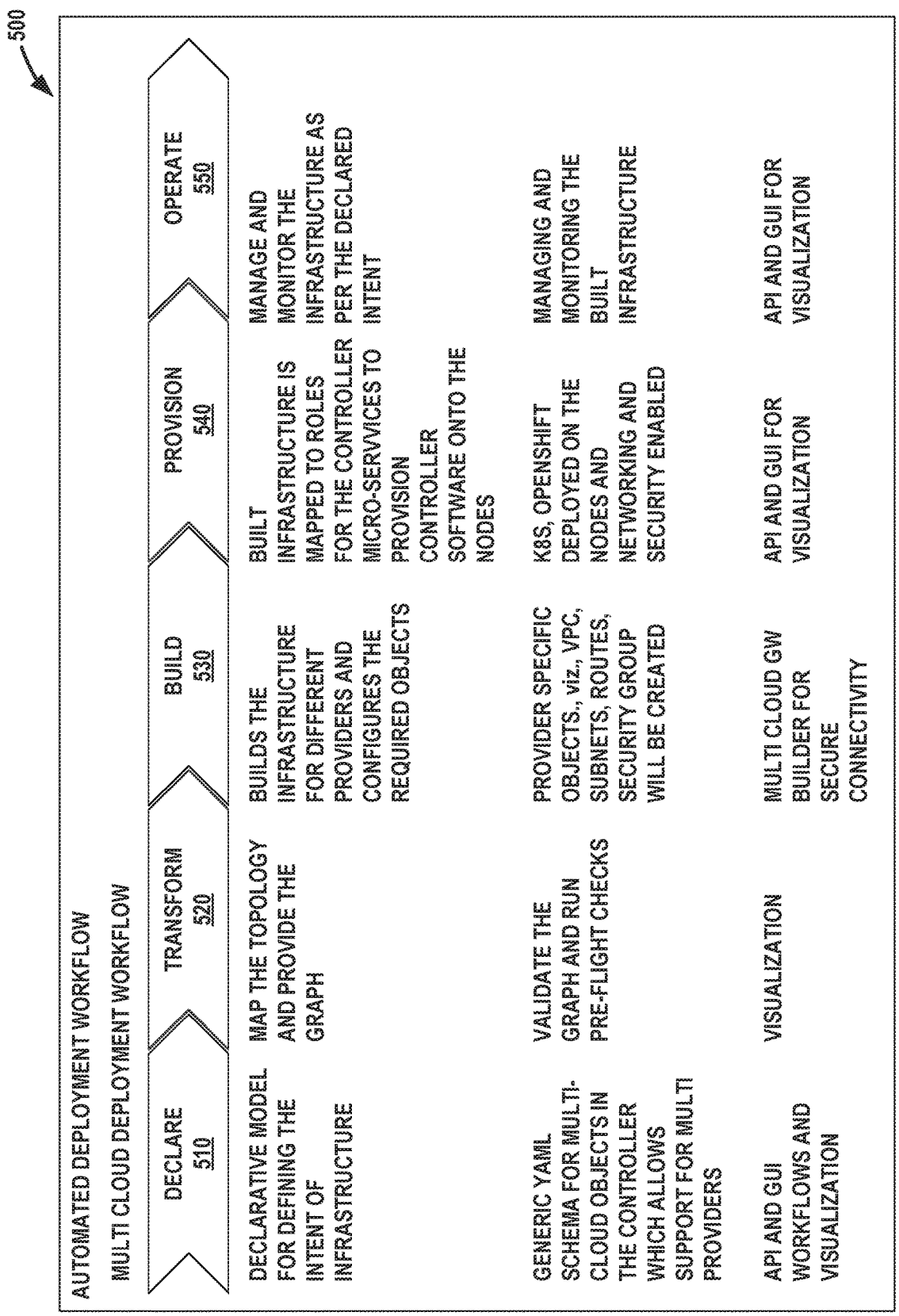
FIG. 5 is a flow diagram illustrating an example operation of building and monitoring a multi-cloud computing infrastructure, according to techniques described in this disclosure.

FIG. 5 is a flow diagram illustrating an example operation 500 of building and monitoring a multi-cloud computing infrastructure, according to techniques described in this disclosure. Example operation 500 is described with respect to network 105 of FIG. 1.

According to example operation 500, a topology file includes a declarative model for defining the intent if infrastructure of one or more servers (510). The declarative model may be a generic YAML schema for multi-cloud objects, which allows support for multiple providers (e.g., public, private clouds, bare-metal server systems, or the like). In some examples, topology 152 may include the declarative model. The declarative model may be a desired topology of one or more servers (e.g., a desired interaction between elements of the one or more servers such as nodes, links, or the like). YAML, or other human-readable languages may be beneficial for encoding the declarative model so that the declarative model can be effectively parsed and applied over many data centers having many different providers (e.g., cloud service providers). In some examples, a graphical user interface (GUI) may display the declarative model such that a user may write and edit the declarative model in the YAML language. In other examples, the GUI may display a visual representation of the declarative model, enabling a user to provide an input indicative of nodes, links or the like to the GUI.

Controller 102 may map the network topology indicated by the declarative model and provide a graph (e.g., a visual representation) of the network topology (520). For example, a parser of transformer 150 may parse the human-readable language of the declarative model and determine an organizational hierarchy of network elements as indicated by the declarative model. The parser may employ linguistic parsing techniques. In other words, the parser may take input data (e.g., the text of the declarative model) and build a data structure giving the graph of the network topology. In some examples, the parser may be programmed by a user. In other examples, the parser may be created using a compiler generator. The graph may include at least one of a parse tree, an abstract syntax tree, a flowchart, a diagram illustrating network connections, or another visual representation.

Further according to example operation 500, controller 102 is configured to build the infrastructure for different providers and configure the required objects (530). Example objects may include variables, data structures, functions, methods, and other values configured to govern a computer program. For example, in computer networking, objects may define connections between one or more forwarding path elements determining how a packet is routed through a forwarding path. A forwarding path element may be of a type to perform a simple action (such as a counter or discard), a conditional, or a complex construct such as a table, tree, or lookup. For example, a packet processor of a router may arrange forwarding path elements as next hop data that can be chained together as a series of "next hops" along an internal packet forwarding path for the packet processor. The result of packet processing determines the manner in which a packet is forwarded or otherwise processed by a packet processor from the packet's input interface on an ingress forwarding unit to its output interface on an egress forwarding unit. As such, objects may define how a packet is routed through a forwarding path.

Objects may, much like connections between forwarding paths, forge connections between one or more elements of a network to create the virtual computing environment defined by a high-level topology description (e.g., topology 152). In some examples, the high-level topology description includes data indicative of at least one of virtual networks, storage, and services provided by the virtual computing environment. For example, controller 102 may use objects to connect at least one of a cloud, a set of security group rules, a virtual machines (VM), a load balancer, a domain name system (DNS), a content delivery network (CDN), or the like. In examples where controller 102 uses objects to determine a set of security group rules within a computing infrastructure, controller 102 may effectively customize a firewall within the computing infrastructure. In other words, data center 110A may use objects to monitor incoming and outgoing network traffic. Controller 102 may specify, using the declarative model, different sets of security group rules corresponding to each server of a plurality of servers within the network. For example, the declarative model may include connections between a server and a corresponding set of security group rules. As such, configuring objects may be integral in building and maintaining the computing infrastructure.

Controller 102 may map the built infrastructure to roles for the controller to provision controller software onto nodes within the network (540). For example, OpenShift and K8s processors may be deployed on network nodes, and networking security may be enabled. The provisioning of the controller software may be visualized on the GUI. Furthermore, data center 110A may manage and monitor the computing infrastructure according to the declarative model (550). For example, if the declarative model is updated, controller 102 may in turn update the computing infrastructure according to changes reflected in the declarative model. Controller 102 may be configured to determine a current state of the computing infrastructure and display a visual representation of the current state on the GUI. The GUI may accept an input indicative of desired changes to the computing infrastructure, and the declarative model may be accordingly updated.

Figure 6:
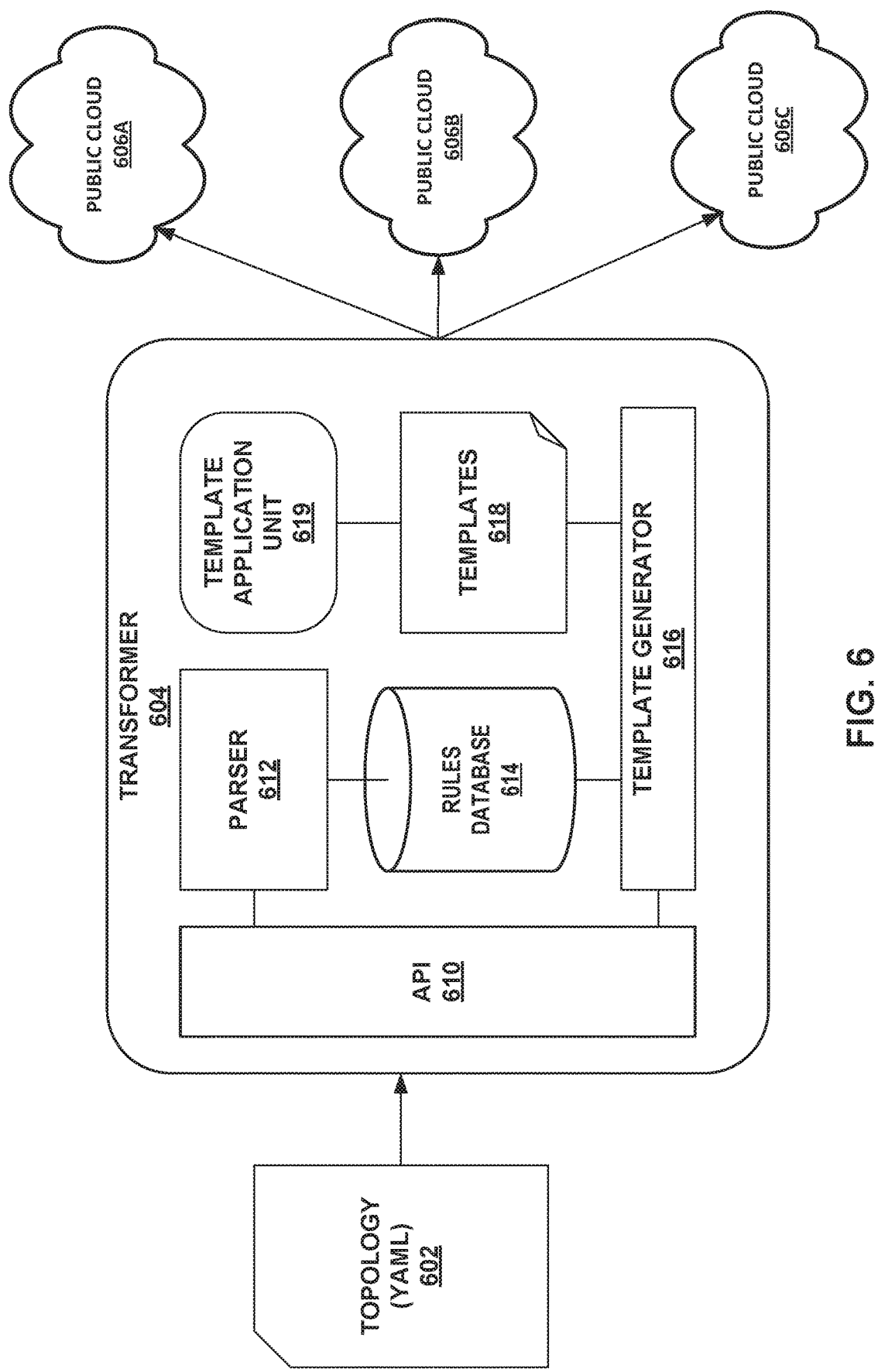
FIG. 6 is a block diagram illustrating an example transformer configured to convert a topology into one or more templates for installing and modifying objects in one or more virtual private clouds (VPCs), according to techniques described in this disclosure.

FIG. 6 is a block diagram illustrating an example transformer 604 configured to convert a topology 602 into one or more templates 618 for installing and modifying objects in one or more public cloud 606A-606C (collectively, (clouds 606). Transformer 604 may include API 610, parser 612, rules database 614, template generator 616, templates 618, and template application unit 619. Transformer 604 may be an example of transformer 150 of FIG. 1. Additionally, topology 602 may be an example of topology 152 of FIG. 1.

In general, transformer 604 may convert topology 602 into a plurality of templates that, once executed by controller 132, will build and modify a virtual computing environment across one or more data centers. Topology 602 may represent high-level topology description for the virtual computing environment to be provisioned in one of a plurality of computing infrastructures. In some examples, topology 602 may be created based on input from a GUI (not pictured). In other examples, topology 602 may be generated automatically by controller 102 of data center 110A. Topology 602 may include lists that differ based on a defined provider. Topology 602 may include one or more projects to be instantiated as virtual computing environments within corresponding clouds 606 to provision an overall multi-cloud virtual computing environment. Depending on the specified provider for a project, different data structures and parameters may be included. Topology 602 may include IP addresses that identify nodes within the desired virtual computing environment. As such, topology 602 may determine the virtual computing environment by specifying IP addresses corresponding to nodes within the network. Topology 602 may be created as follows:

Creating Topology

This section provides all the information that is required to create topology.yml. Topology is a list with defined provider. Depending on provider different data structure and parameters is needed.

1. OnPrem

OnPrem is provider. There could be instances that are running already OR new instances that need to be create. Connection to the hosts via ssh needs to be setup and is pre-requisite.

Note: All the instances deployed by contrail-multi-cloud assumes the operating system to be centos7.4

1.1 Fields Specification OnPrem Provider:
provider: [string] (required)
organization: [string] (optional)
project: [string] (optional)
instances: [list][instance] (required)
OnPrem Instance:
name: [string][unique] (required)
public_ip: [string][ip] (required)
private_ip: [string][ip] (required)
private_subnet: [string][cidr] (required)
vip: [string][ip] (required)
roles: [list][role] (required)
provision: [bool] (required)
username: [string] (required)
interface: [string][interface]
protocols: [list][protocol] (optional)
Roles:
   gateway: multicloud gateway
   compute_node: contrail compute node and k8s-nodes
   controller: contrail controller and k8s-master Protocols:
    ipsec_client: allow instance act as ipsec client
    ipsec_server: allow instance act as ipsec server
    ssl_client: allow instance act as ssl client
    ssl_server: allow instance act as ssl server
1.2 Define OnPrem Provider Filed Provider should have Value OnPrem.
provider: OnPrem
Fields organization and project are optional, this filed could specification project and organization.
organization: Juniper
project: multi-cloud
1.3 Define OnPrem Instance Filed Instances should have List with Instance Object.
Instance:
    name: instance name
    public_ip: external ip, which will be used by ansible
    private_ip: internal ip
    private_subnet: subnet which will be advertised by BIRD
    vip: virtual ip, which will be used by vrrp
    roles: list role for this host
    provision: contrail provision
    username: host username which will be used by ansible
    interface: interface which will be used by vrouter
    protocols: list protocol which will be allow this host, if this host is gateway o
        default for OnPrem [ssl_clinet], this setup no required public_ip reachable for Internet
Example:
name: OnPrem
roles:
- gateway
provision: true
username: root
public_ip: 10.10.10.10
private_ip: 192.168.100.17
private_subnet: 192.168.100.0/24
interface: eth1
vip: 192.168.100.254
protocols:
- ipsec_client
1.4 Examples
OnPrem with two host, one gateway and hybird(controller and compute host)
- provider: onprem
organization: juniper
project: multicloud
instances:
    - name: GW 1 OnPrem
      roles:
        - gateway
      provision: true
      username: root
      public_ip: 10.10.10.10
      private_ip: 192.168.100.17
      private_subnet: 192.168.100.0/24
      interface: eth1
      vip: 192.168.100.254
      protocols:
        - ssl_client
        - ssl_server
    - name: Controller
      roles:
        - controller
        - compute_node
      provision: true
      username: root
      public_ip: 11.11.11.11
      private_ip: 192.168.100.77
      private_subnet: 192.168.100.0/24
      interface: eth1
      vip: 192.168.100.254
OnPrem with four host, two gateways, controller and compute host
- provider: onprem
organization: juniper
project: multicloud
instances:
    - name: GW 1 OnPrem
      roles:
        - gateway
      provision: true
      username: root
      public_ip: 10.10.10.10
      private_ip: 192.168.100.17
      private_subnet: 192.168.100.0/24
      interface: eth1
      vip: 192.168.100.254
      protocols:
        - ssl_client
        - ssl_server
    - name: GW 2 OnPrem
      roles:
        - gateway
      provision: true
      username: root
      public_ip: 77.77.77.77
      private_ip: 192.168.100.57
      private_subnet: 192.168.100.0/24
      interface: eth1
      vip: 192.168.100.254
      protocols:
        - ssl_client
        - ssl_server
    - name: Controller
      roles:
        - controller
      provision: true
      username: root
      public_ip: 11.11.11.11
      private_ip: 192.168.100.187
      private_subnet: 192.168.100.0/24
      interface: eth1
    - name: Compute_node
      roles:
        - compute_node
      provision: true
      username: root
      public_ip: 13.13.13.13
      private_ip: 192.168.100.67
      private_subnet: 192.168.100.0/24
      interface: eth1
2 AWS
AWS is provider for Amazon Web Services. It means any instance and reource defined will be create by terraform.
1.1 Fields Specification AWS Provider:
provider: [string] (required)
organization: [string] (optional)
project: [string] (optional)
regions: [list][region] (required)
AWS Region:
name: [string][unique] (required)
clouds: [list][cloud] (required)

```
AWS Cloud:
name: [string][unique] (required)
cidr_block: [string][cidr] (required)
subnets: [list][subnet] (required)
security_groups: [list][security_group] (required)
instances: [list][instance] (required)
AWS Subnet:
name: [string][unique] (required)
cidr_block: [string][cidr] (required)
availability_zone: [string][availability_zone] (required)
AWS Security_Group:
name: [string][unique] (required)
ingress: [string][rule] (optional)
egress: [string][rule] (optional)
AWS Instance:
name: [string][unique] (required)
roles: [list][role] (required)
provision: [bool] (required)
username: [string] (required)
interface: [string][interface] (required)
protocols: [list][protocol] (optional)
availability_zone: [string][availability_zone] (required)
machine_id: [string][ami] (required)
instance_type: [string][instance_type] (required)
security_groups: [list][security_group.name] (required)
subnets: [subnet.name] (required)
volume_size: [string] (optional)
Interface:
    vrouter (for aws)
    *or physical interface
Machine Id: *instance_type depends on region
NOTE: For list of centos AWS AMI per region, please click here—centos-ami
Instance Type: *ami depends on ami recommended: Compute optimized
Volume Size: minimum: - gateway:#TODO fill - controller: #TODO fill - compute_node: #TODO fill
recommended: - gateway: #TODO fill - controller:#TODO fill - compute_node: #TODO fill
Availability Zone:
    a
    b
    c*depends if region support
1.3 Define AWS Regions in Regions is List of Object Region.
Region:
    name: name of aws region
    clouds: list cloud objects, that will be created in this region by terraform
Example:
    name: eu-west-1
    clouds:
    - name: vpc_1
    . . .
Cloud(vpc):
    name: name for virtual private cloud
    cidr_block: cidr_block for virtual private cloud
    subnets: list of subnet objects, that will be created in this vpc by terraform
    security_groups: list of security_group objects, that will be created in this vpc by terraform
    instances: list of instance objects, that will be created in this vpc by terraform
Example:
name: vpc_1
cidr_block: 172.16.0.0/23
subnets:
    - name: subnet 1
    . . .
security_groups:
    - name: all_in
    . . .
instances:
    - name: GW_1
    . . .
Subnet:
    name: name for subnet
    cidr_block: cidr for this subnet, must me unique and belong to vpc cidr_block
    availability_zone: availability_zone for this subnet
Example:
name: subnet 1
cidr_block: 172.16.0.0/24
availability_zone: a
Security Group:
    name: name for security group
    ingres: ingrees rule (terraform from)
    engress: engress rule (terraform from)
Example:
name: name: all_in_all_out
ingress:
    from_port: 0
    to_port: 0
    protocol: "-1"
    cidr blocks:
        - "0.0.0.0/0"
egress:
    from_port: 0
    to_port: 0
    protocol: "-1"
    cidr blocks:
        - "0.0.0.0/0"
Instance:
    name: name for instance
    roles: list role for this host
    provision: contrail provision
    username: host username which will be used by ansible, depends on ami
    interface: interface which will be used by vrouter, must be vrouter
    protocols: list protocol which will be allow this host, if this host is gateway
        default for aws [ssl_clinet, ssl_server, ipsec_client, ipsec_server]
    availability_zone: availability_zone for this subnet
    machine_id: ami id
    instance_type: instance type, depends on ami
    security_groups: list of security groups name which will be allayed to this instance
    subnets: subnet name which will be connected to this instance as private subnet
    volume_size: optional addition storage for this instance
Example:
name: GW_1_grazyna
availability_zone: a
roles:
    - gateway
provision: true
username: centos
machine_id: ami-ee6a718a
instance_type: c4.large
volume_size: 10
``` security_groups:
    - all_in_all_out
subnets: subnet_1
interface: eth1
3 GCP
Google is provider for Google cloud platform. It means any instance and resource defined will be create by terraform.
1.1 Fields Specification Google Provider:
provider: [string] (required)
organization: [string] (optional)
project: [string] (required)
regions: [list][region] (required)
Google Region:
name: [string][unique] (required)
clouds: [list][cloud] (required)
Google Cloud:
name: [string][unique] (required)
subnets: [list][subnet] (required)
firewalls_external: [list][firewall_rule] (required)
firewalls_internal: [list][firewall_rule] (required)
instances: [list][instance] (required)
Google Subnet:
name: [string][unique] (required)
cidr_block: [string][cidr] (required)
Google Firewalls_External:
name: [string][unique] (required)
allow: [string][rule] (optional)
deny: [string][rule] (optional)
Google Firewalls_Internal:
[list][rule]
Google Rule:
name: [string][unique] (required)
allow: [string][rule] (optional)
deny: [string][rule] (optional)
Google Allow/Deny:
protocol: tcp, udp, icmp, esp, ah, sctp
ports: list of ports and/or port ranges
Google Instance:
name: [string][unique] (required)
roles: [list][role] (required)
provision: [bool] (required)
username: [string] (required)
interface: [string][interface] (required)
protocols: [list][protocol] (optional)
availability_zone: [string][availability_zone] (required)
machine_id: [string][ami] (required)
instance_type: [string][instance_type] (required)
subnets: [subnet.name] (required)
volume_size: [string] (optional)
Machine Id: *instance_type depends on region
Volume Size: minimum: - gateway:#TODO fill - controller: #TODO fill - compute_node: #TODO fill
recommended: - gateway: #TODO fill - controller:#TODO fill - compute_node: #TODO fill
Availability Zone:
    a
    b
    c*depends if region support
Example:
name: europe-west3
clouds:
    - name: vpc_1
    . . .
Cloud(vpc):
    name: name for virtual private cloud
    cidr_block: cidr_block for virtual private cloud
    subnets: list of subnet objects, that will be created in this vpc by terraform
    firewalls_external: list of firewall objects, that will be created in this vpc by terraform
    firewalls_internal: list of firewall objects, that will be created in this vpc by terraform
    instances: list of instance objects, that will be created in this vpc by terraform
Example:
name: vpc_1
cidr_block: 172.16.0.0/23
subnets:
    - name: subnet_1
    . . .
firewalls_internal:
    - name: all
    . . .
firewalls_external:
    - name: all
    . . .
instances:
    - name: GW_1
Subnet:
    name: name for subnet
    cidr_block: cidr for this subnet, must me unique and belong to vpc cidr_block
Example:
name: subnet_1
cidr_block: 172.16.0.0/24
firewalls external: [list rule]
firewalls internal: [list rule]
Example:
firewalls_external:
    - name: all-icmp
    allow:
    protocol: icmp
firewalls_internal:
    - name: all-tcp
    allow:
      protocol: tcp
Instance:
    name: name for instance
    roles: list role for this host
    provision: contrail provision
    username: host username which will be used by ansible, depends on ami
    interface: interface which will be used by vrouter
    protocols: list protocol which will be allow this host, if this host is gateway o
        default for aws [ssl_clinet, ssl_server, ipsec_client, ipsec_server]
    availability_zone: availability_zone for this subnet
    machine_id: image id
    instance_type: machine_type
    firewalls_external: list of firewall rule
    firewalls_internal: list of firewall rule
    subnets: subnet name which will be connected to this instance as private subnet
    volume_size: optional addition storage for this instance
Example:
name: GW_1_grazyna
availability_zone: a
roles:
    - gateway
provision: true
username: ubuntu
machine_id: ubuntu-1604-xenial-v20170307

```
instance_type: n1-standard-1
volume_size: 10
subnets: subnet_1
interface: eth1
Modification
This chapter will add a new compute host to the VPC as well
as a new VPC altogether. This is useful when the current
deployment capabilities are too low.
Modify the Topology
Change the topology.yml so it says the following. Please
notice head of the file is not changed and only some data was
appended.
- provider: aws
  organization: juniper
  project: contrail-multicloud
  regions:
  - name: eu-central-1
    clouds:
      - name: scaling-vpc-1
        cidr_block: 172.16.0.0/23
        subnets:
          - name: subnet_1_scaling-vpc-1
            cidr_block: 172.16.0.0/24
            availability_zone: a
        security_groups:
          - name: all_in_scaling-vpc-1
            ingress:
              from_port: 0
              to_port: 0
              protocol: "-1"
              cidr blocks:
                - "0.0.0.0/0"
          - name: all_out_scaling-vpc-1
            egress:
              from_port: 0
              to_port: 0
              protocol: "-1"
              cidr blocks:
                - "0.0.0.0/0"
        instances:
          - name: Contrail_GW_scaling-vpc-1
            availability_zone: a
            roles:
              - gateway
            provision: true
            username: centos
            machine_id: ami-337be65c
            instance_type: t2.xlarge
            volume_size: 10
            security_groups:
              - all_out_scaling-vpc-1
              - all_in_scaling-vpc-1
            subnets: subnet_1_scaling-vpc-1
            interface: vrouter
          - name: Contrail_controller_scaling-vpc-1
            availability_zone: a
            provision: true
            username: centos
            roles:
              - controller
              - k8s master
            machine_id: ami-337be65c
            instance_type: t2.xlarge
            volume_size: 24
            security_groups:
              - all_out_scaling-vpc-1
              - all_in_scaling-vpc-1
            subnets: subnet_1_scaling-vpc-1
            interface: eth0
          - name: Compute_scaling-vpc-1
            availability_zone: a
            provision: true
            username: centos
            roles:
              - compute_node
            machine_id: ami-337be65c
            instance_type: t2.xlarge
            volume_size: 24
            security_groups:
              - all_out_scaling-vpc-1
              - all_in_scaling-vpc-1
            subnets: subnet_1_scaling-vpc-1
            interface: eth0
          - name: Another_compute_scaling-vpc-1
            availability_zone: a
            provision: true
            username: centos
            roles:
              - compute_node
            machine_id: ami-337be65c
            instance_type: t2.xlarge
            volume_size: 24
            security_groups:
              - all_out_scaling-vpc-1
              - all_in_scaling-vpc-1
            subnets: subnet_1_scaling-vpc-1
            interface: eth0
      - name: scaling-vpc-2
        cidr_block: 172.18.0.0/23
        subnets:
          - name: subnet_1_scaling-vpc-2
            cidr_block: 172.18.0.0/24
            availability_zone: a
        security_groups:
          - name: all_in_scaling-vpc-2
            ingress:
              from_port: 0
              to_port: 0
              protocol: "-1"
              cidr blocks:
                - "0.0.0.0/0"
          - name: all_out_scaling-vpc-2
            egress:
              from_port: 0
              to_port: 0
              protocol: "-1"
              cidr blocks:
                - "0.0.0.0/0"
        instances:
          - name: Contrail_GW_scaling-vpc-2
            availability_zone: a
            roles:
              - gateway
            provision: true
            username: centos
            machine_id: ami-337be65c
            instance_type: t2.xlarge
            volume_size: 10
            security_groups:
              - all_out_scaling-vpc-2
              - all_in_scaling-vpc-2
            subnets: subnet_1_scaling-vpc-2
            interface: vrouter
          - name: Compute_scaling-vpc-2
```

```
        availability_zone: a
        provision: true
        username: centos
        roles:
           - compute_node
        machine_id: ami-337be65c
        instance_type: t2.xlarge
        volume_size: 24
        security_groups:
           - all_out_scaling-vpc-2
           - all_in_scaling-vpc-2
        subnets: subnet_1 scaling-vpc-2
        interface: eth0
```
The other VPC may use a different IP address pool.
Apply the modification to topology file
Use the following command to update terraform about the changes
./transform/generate_topology.py -t topology.yml -s secret-.yml
Create necessary resources
Use this command to create the resources on AWS
terraform apply -auto-approve
Regenerate the inventory
Type the following to create an inventory and contrail config:
transform/generate_inventories.py -t topology.yml -s secret-t.yml -ts terraform.tfstate
This should create the inventories, contrail config as well as state.yml.
Update the gateways
Use Ansible to update the gateways and provision the new one
ansible-playbook -i inventories/inventory.yml ansible/gateway/playbooks/deploy_and_run_all.yml
Configure new container hosts
Use this command to prepare new hosts for Contrail deployment:
ansible-playbook -i inventories/inventory.yml ansible/contrail/playbooks/configure.yml Topology 602 may be an arrangement of compute nodes, network nodes, and virtual networks, etc., of a network. These are known as instances. Additionally, or alternatively, topology 602 may include a plurality of projects, each project of the plurality of projects associated with a cloud of clouds 606. In other words, topology 602 may represent a preferred infrastructure of the network including a web of objects associated with at least one of VPCs 606. In some examples, topology 602 is written in human-readable data serialization language, e.g., YAML. YAML may be configured to encode scalars, lists, associative arrays, or the like. As an example, topology 602 may include the following language to define projects for an on-premises virtual computing environment and three other projects for public cloud-based virtual computing environments to provision an overall multi-cloud virtual computing environment (or "multi-cloud topology"):
```
- provider: onprem
  organization: juniper-contrail
  project: juniper-contrail
  instances:
     - name: OnPremGW-1
       roles:
          - gateway
       provision: true
       username: root
       password: c0ntrail123
       public_ip: 10.87.65.157
       private_ip: 172.16.75.157
       private_subnet: 172.16.64.0/23
       interface: p514p1
       vip: 172.16.75.253
       protocols:
          - ssl_client
- provider: google
  organization: juniper-contrail
  project: contrail-codilime-multicloud
  regions:
     - name: us-west1
       clouds:
          - name: gcn-contrail-pvt
            subnets:
               - name: subnet-1
                 cidr_block: 192.168.2.0/24
            firewalls_external:
               - name: all-wan
                 allow:
                    protocol: all
            firewalls_internal:
               - name: all-lan
                 allow:
                    protocol: all
            instances:
               - name: gcloud-contrail-gw
                 roles:
                    - gateway
                 provision: true
                 username: ubuntu
                 os: ubuntu16
                 instance_type: n1-standard-1
                 subnets: subnet-1
                 interface: ens5
               - name: gcloud-contrail-k8s-node-1
                 provision: true
                 username: ubuntu
                 roles:
                    - compute_node
                 os: ubuntu16
                 instance_type: n1-standard-1
                 subnets: subnet-1
                 interface: ens4
               - name: gcloud-contrail-k8s-node-2
                 provision: true
                 username: ubuntu
                 roles:
                    - compute_node
                 os: ubuntu16
                 instance_type: n1-standard-1
                 subnets: subnet-1
                 interface: ens4
- provider: aws
  organization: juniper-contrail
  project: contrail-multicloud
  regions:
     - name: us-east-1
       clouds:
          - name: aws-contrail
            cidr_block: 192.168.0.0/23
            subnets:
               - name: subnet_1_aws-contrail
                 cidr_block: 192.168.0.0/24
                 availability_zone: a
            security_groups:
               - name: all_in_aws-contrail
```

```
        ingress:
            from_port: 0
            to_port: 0
            protocol: "-1"
            cidr blocks:
                - "0.0.0.0/0"
        - name: all_out_aws-contrail
            egress:
                from_port: 0
                to_port: 0
                protocol: "-1"
                cidr blocks:
                    - "0.0.0.0/0"
    instances:
        - name: aws-contrail-gw
          availability_zone: a
          roles:
              - gateway
          provision: true
          username: ubuntu
          machine_id: ami-5c66ea23
          instance_type: c4.large
          volume_size: 24
          security_groups:
              - all_out_aws-contrail
              - all_in_aws-contrail
          subnets: subnet_1_aws-contrail
          interface: eth1
          protocols_mode:
              - ssl_server
        - name: aws-contrail-k8s-node
          availability_zone: a
          provision: true
          username: ubuntu
          roles:
              - compute_node
          machine_id: ami-5c66ea23
          instance_type: c4.large
          volume_size: 24
          security_groups:
              - all_out_aws-contrail
              - all_in_aws-contrail
          subnets: subnet_1_aws-contrail
          interface: eth0
- provider: azure
  organization: Juniper
  project: contrail-codilime-multicloud
  regions:
      name: WestUS2
      resource_group: contrail-multicloud
      clouds:
          - name: contrail-az-1
            cidr_block: 192.168.0.0/16
            subnets:
                - name: subnet_contrail_az_1
                  cidr_block: 192.168.1.0/24
                  security_group: allow_all_protocols
            security_groups:
                - name: allow_all_protocols-contrail-az-1
                  rules:
                      - name: all_in-contrail-az-1
                        direction: inbound
                      - name: all_out-contrail-az-1
                        direction: outbound
            instances:
                - name: az-contrail-gw-1
                  roles:
                      - gateway
                  provision: true
                  username: ubuntu
                  os: ubuntu16
                  instance_type: Standard_F16s_v2
                  subnets: subnet contrail_az_1
                  interface: eth1
                - name: controller-contrail-az-1
                  provision: true
                  username: ubuntu
                  roles:
                      - controller
                      - k8s master
                  os: ubuntu16
                  instance_type: Standard_F32s_v2
                  subnets: subnet contrail_az_1
                  interface: eth0
                - name: compute-contrail-az-1
                  provision: true
                  username: ubuntu
                  roles:
                      - compute_node
                  os: ubuntu16
                  instance_type: Standard_F16s_v2
                  subnets: subnet contrail_az_1
                  interface: eth0
          - name: contrail-az-2
            cidr_block: 10.0.0.0/16
            subnets:
                - name: subnet contrail_az_2
                  cidr_block: 10.0.1.0/24
                  security_group: allow_all_protocols-contrail-az-2
            security_groups:
                - name: allow_all_protocols-contrail-az-2
                  rules:
                      - name: all_in-contrail-az-2
                        direction: inbound
                      - name: all_out-contrail-az-2
                        direction: outbound
            instances:
                - name: az-contrail-gw-2
                  roles:
                      - gateway
                  provision: true
                  username: ubuntu
                  os: ubuntu16
                  instance_type: Standard_F16s_v2
                  subnets: subnet contrail_az_2
                  interface: eth1
                - name: compute-contrail-az-2
                  provision: true
                  username: ubuntu
                  roles:
                      - compute_node
                  os: ubuntu16
                  instance_type: Standard_F16s_v2
                  subnets: subnet contrail_az_2
                  interface: eth0
```

Application Programming Interfaces (APIs) may facilitate the creation of and the communication between applications. For example, (API) 610 comprises a defined interface through which transformer 604 interacts with other computing devices to receive topology 602. API 602 may be configured to "pull" data from topology 602. Although illustrated in FIG. 2 as including a single API 610, in other examples, transformer 604 may include a plurality of APIs to pull the context data from the plurality of back-end systems.

Parser 612 may parse the human-readable language of topology 602 and determine an organizational hierarchy of network elements as indicated by topology 602. The parser may employ linguistic parsing techniques. In other words, parser 612 may take input data (e.g., the text of topology 602) and build a data structure giving the graph of topology 602. More specifically, parser 612 may diagram a web of objects within topology 602 such that connections of the web of objects become apparent. In some examples, parser 612 may be programmed by a user. In other examples, parser 612 may be created using a compiler generator. The graph may include at least one of a parse tree, an abstract syntax tree, a flowchart, a diagram illustrating network connections, or another visual representation.

Rules Database 614 may include a plurality of rules that govern the conversion of topology 602 into templates 618 using template generator 616. Each rule of rules database 614 may include at least one condition that determines whether a rule is a success or a failure. Each condition may include at least one fact, at least one operator, and at least one value. Additionally, each rule may include an event. If the rule is deemed to be a success, the event is triggered. When a rule of rules database 614 is evaluated, transformer 604 uses the at least one operator to compare the at least one fact and the at least one value. A rule may implement at least one of an all operator or an any operator. All operators require that every condition of the plurality of conditions of the rule must be truthy in order for the rule to be considered a success. Any operators require that at least one condition of the plurality of conditions of the rule must be truthy in order for the rule to be considered a success. In some examples, all operators and any operators may be nested to create complex Boolean expressions.

Transforming the topology 602 to the templates 818 based on the plurality of rules may include applying, for a rule of the set of rules, a set of conditions to topology 602. Transformer 604 may determine, for each applied condition of the set of conditions, if the respective condition represents a success. In response to determining that at least one condition of the set of conditions represents a success, transformer 604 may execute an event corresponding to the rule of the set of rules. To execute the event, transformer 604 may identify, in the topology 602 an object corresponding to a provider and place the object in a template of the respective templates 618 according to the provider corresponding to the object.

In some examples, template generator 616 may use at least one rule of rules database 614 to determine an identity of a cloud such that transformer 604 may create a template including objects corresponding to each cloud. By identifying a cloud associated with each object, template generator 616 enables transformer 604 to apply each object of topology 602 to the correct cloud of cloud 606. The following example rule may be included in rules database 614:

```
let GoogleCloudRule = {
    conditions: {
        all: [{
            fact: 'account-information',
            operator: 'equal',
            value: 'GCP',
            path: '.tenant' // access the tenant property of
```

```
            "account-information"
        }, {
            fact: 'VPC',
            operator: 'in',
            value: ['active'],
            path: '.status'
        }, {
            fact: 'subnet',
            operator: 'contains',
            value: '',
            path: '.prefix'
        }, {
            fact: 'security-group',
            operator: 'contains',
            value: '',
            path: '.sgid'
        }]
    },
    event: {
        type: 'Google-Cloud-Event',
        params: {
            message: 'current Google cloud object'
        }
    }
}
engine.addRule(GoogleCloudRule)
```

The example rule contains four conditions, which include: [{fact: 'account-information', perator: 'equal', value: 'GCP', path: '.tenant' // access the tenant property of "account-information"}, {fact: 'VPC', operator: 'in', value: ['active'], path: '.status'}, {fact: 'subnet', operator: 'contains', value: '', path: '.prefix'}, {fact: 'security-group', operator: 'contains', value: '', path: '.sgid'}]. The example rule includes a single event, which is as follows: event: {type: 'Google-Cloud-Event', params: {message: 'current Google cloud object'}}. The example rule employs an all operator, which means that each of the four conditions must be a success for transformer 604 to deem the example rule a success and trigger the event. As such, in order to trigger the event which identifies an object of topology 602 as a Google cloud object, the 'account-information' must equal 'GCP, the 'VPC' must be 'active', the 'subnet' must contain the value'', and the 'security-group' must contain the value''. In response to determining that an object of topology 602 is a Google cloud object, transformer 604 may apply the object to VPC 606B. In addition to the above example rule, rules database 614 may also include the following example rules:

```
import { Engine } from 'json-rules-engine'
Engines = ['aws', 'google', 'azure']
/**
 * Setup a new engine
 */
let engine = new Engine( )
/**
 * Rule for identifying AWS, Google and Azure,
 *
 */
let AzureRule = {
    conditions: {
        all: [{
            fact: 'account-information',
            operator: 'equal',
            value: 'azure',
            path: '.tenant' // access the tenant property of
                "account-information"
        }, {
            fact: 'Virtual Networks',
            operator: 'in',
            value: ['active'],
```

-continued

```
                path: '.status'
        }, {
                fact: 'subnet',
                operator: 'contains',
                value: ' ',
                path: '.prefix'
        }, {
                fact: 'security-group',
                operator: 'contains',
                value: ' ',
                path: '.sgid'
        }]
    },
    event: {
        type: 'Azure-Cloud-Event',
        params: {
            message: 'current Azure cloud object'
        }
    }
}
engine.addRule(AzureRule)
let AWSRule = {
        conditions: {
                all: [{
                        fact: 'account-information',
                        operator: 'equal',
                        value: 'AWS',
                        path: '.tenant' // access the tenant property of
                            "account-information"
                }, {
                        fact: 'VPC',
                        operator: 'in',
                        value: ['active'],
                        path: '.status'
                }, {
                        fact: 'subnet',
                        operator: 'contains',
                        value: '',
                        path: '.prefix'
                }, {
                        fact: 'security-group',
                        operator: 'contains',
                        value: '',
                        path: '.sgid'
                }]
        },
        event: {
            type: 'AWS-Event',
            params: {
                message: 'current AWS cloud object'
            }
        }
}
engine.addRule(AWSRule)
```

Template generator 616 may operate using Ansible, which is a software that automates provisioning, configuration management, and application deployment. As such, template generator 616 may employ ansible to execute the rules of rules database 614 to convert topology 602 parsed by parser 612 into one or more templates 618. Templates 618 may include at least one template corresponding to each of clouds 606. In some examples, template application unit 619 may apply templates 618 to clouds 606 using a controller, such as controller 104 of FIG. 1. More specifically, template application unit 619 may install and modify objects within clouds 606 to customize the plurality of computing infrastructures of clouds 606. Although transformer 604 of FIG. 6 is described with respect to public clouds, template application unit 619 may also apply templates 618 corresponding to public clouds, on-premises clouds, bare-metal server systems, or other types of data centers. Further, modification to or provisioning of clouds 606 may involve only creating/modification/provisioning of VPCs therein. Template application unit 619 may use terraform, an infrastructure as code (IaC) software, to apply templates 618 to clouds 606.

Terraform is software that enables managing and provisioning data centers using machine-readable definition files rather than using physical hardware configurations or interactive configuration tools. Firstly, terraform may provision a computing infrastructure based on a desired infrastructure configuration. Secondly, after creating the computing infrastructure, terraform is configured to modify the computing infrastructure according to desired infrastructure modifications. In some examples, terraform may use three basic operations: refresh, plan, and apply. Terraform refresh enables template application unit 619 to observe a current state of the computing infrastructure. Terraform plan allows template application unit 619 to compare a desired virtual computing infrastructure with the current state of the computing infrastructure. Additionally, terraform apply enables template application unit 619 to apply objects to the network such that the network implements the desired computing infrastructure. Templates 618 represent a plurality of desired computing infrastructures of clouds 606. Template application unit 619 may observe the current state of the computing infrastructure in each of clouds 606, and using templates 618, template application unit 619 may plan changes to the plurality of computing infrastructures of clouds 606. Subsequently, template application unit 619 may apply templates 618 to clouds 606, thus implementing the plurality of desired virtualized infrastructures within clouds 606.

Figure 7:
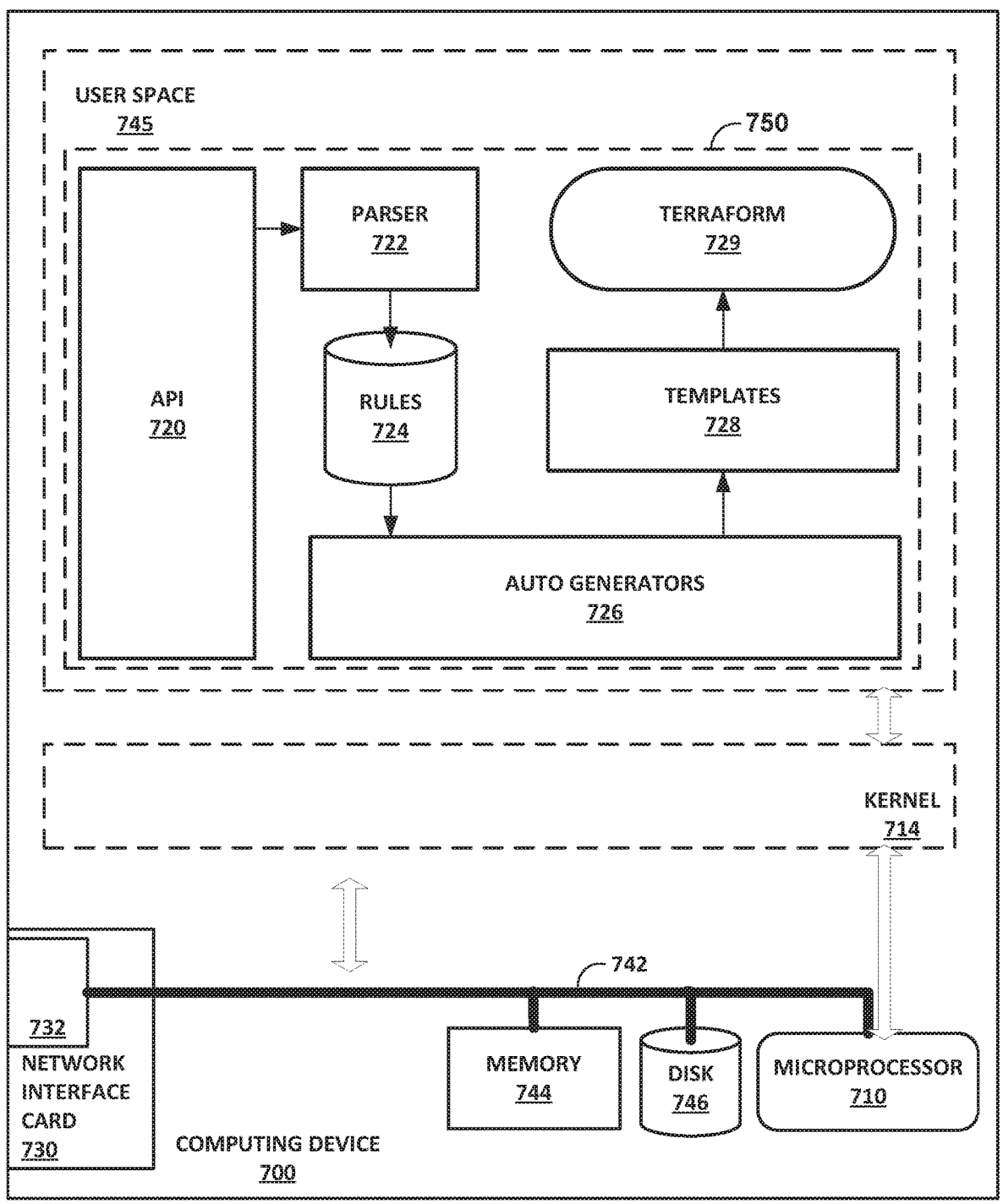
FIG. 7 is a block diagram illustrating an example computing device, according to techniques described in this disclosure.

FIG. 7 is a block diagram of an example computing device 700, according to techniques described in this disclosure. Computing device 700 may be an example instance of controller 102 of FIG. 1 for a cloud computing infrastructure. Computing device 700 of FIG. 7 may represent one or more real or virtual servers configured to perform operations for at least one of a SDN controller 132 and an orchestrator 130. As such, computing device 700 may in some instances implement one or more master nodes for respective clusters of minion nodes.

API 720, parser 722, rules 724, auto generators 726, templates 728, and terraform 729, although illustrated and described as being executed by a single computing device 700, may be distributed among multiple computing devices 700. Each of the multiple computing devices 700, in other words, may provide a hardware operating environment for one or more instances of any one or more API 720, parser 722, rules 724, auto generators 726, templates 728, and terraform 729.

Computing device 700 includes in this example, a bus 742 coupling hardware components of a computing device 700 hardware environment. Bus 742 couples network interface card (NIC) 730, storage disk 746, and one or more microprocessors 710 (hereinafter, "microprocessor 310"). A front-side bus may in some cases couple microprocessor 710 and memory device 744. In some examples, bus 742 may couple memory device 744, microprocessor 710, and NIC 730. Bus 742 may represent a Peripheral Component Interface (PCI) express (PCIe) bus. In some examples, a direct memory access (DMA) controller may control DMA transfers among components coupled to bus 742. In some examples, components coupled to bus 742 control DMA transfers among components coupled to bus 742.

Microprocessor 710 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 746 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 710.

Main memory 744 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 730 includes one or more interfaces 732 configured to exchange packets using links of an underlying physical network. Interfaces 732 may include a port interface card having one or more network ports. NIC 730 may also include an on-card memory to, e.g., store packet data. Direct memory access transfers between the NIC 730 and other devices coupled to bus 742 may read/write from/to the NIC memory.

Memory 744, NIC 730, storage disk 746, and microprocessor 710 may provide an operating environment for a software stack that includes an operating system kernel 714 executing in kernel space. Kernel 714 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 714 provides an execution environment for one or more processes in user space 745.

Computing device 700 may be coupled to a physical network switch fabric that includes an overlay network that extends switch fabric from physical switches to software or "virtual" routers of physical servers coupled to the switch fabric, such virtual router 220 of FIG. 2. Computing device 700 may use one or more dedicated virtual networks to configure minion nodes of a cluster.

Transformer 750 including API 720, rules 724, auto generators 726, templates 728, and terraform 729 may convert topology 152 into one or more templates, that define instructions for configuring a plurality of computing infrastructures in one or more data centers. These components may represent examples of corresponding components of transformer 604.

Figure 8:
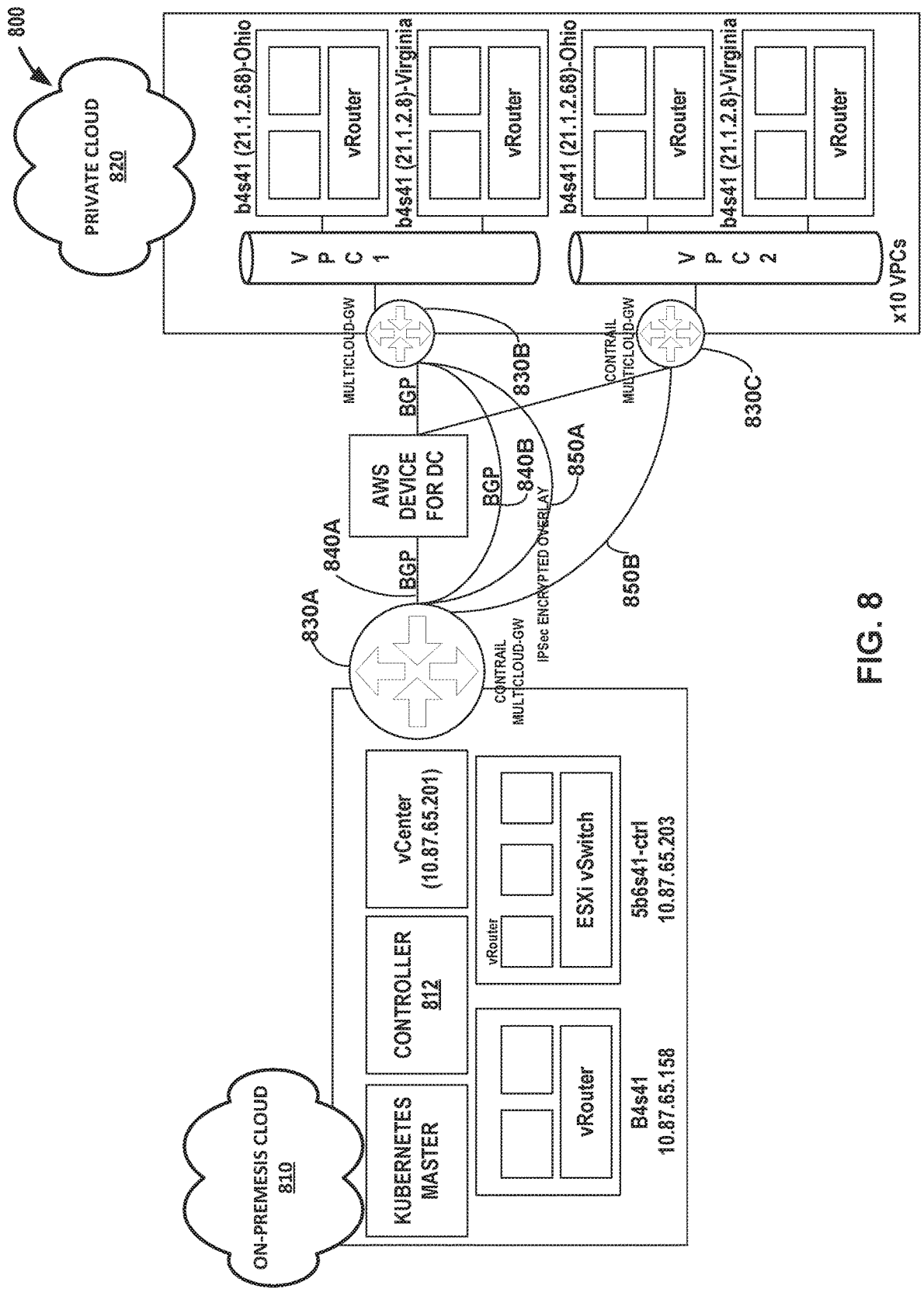
FIG. 8 is a block diagram illustrating another example controller for directing containers within a network, according to techniques described in this disclosure.

FIG. 8 is a block diagram illustrating another example controller for directing containers within a multi-cloud infrastructure 800, according to techniques described in this disclosure. The infrastructure 800 of FIG. 8 includes on-premises cloud 810 and private cloud 820. Controller 812 may distribute data (e.g., packets, objects, containers, applications, or the like) via gateway portals 830A-830C (collectively, gateway 830). Gateway 830 may be an example of gateway 230 of FIG. 2. In some examples, various gateway portals of gateway 830 may be connected using a group of pathways. For example, gateway portal 830A and gateway portal 830B may be connected by a border gateway protocol (BGP) 840A and an Internet Protocol Security (IPSec) Encrypted Overlay channel 850A. BGP is a standardized exterior gateway protocol for exchanging routing and reachability information between servers. For example, BGPs may transmit information required to route packets through one or more routers (e.g., the vRouters of infrastructure 800). BGP sessions may or may not be encrypted. Consequently, it may be beneficial for Gateway 830 to include secure channels for transmitting routing information between gateway portals. IPSec encrypted overlay channels 850 may connect gateway portals such that routing information may be transmitted in a secure manner.

Figure 9:
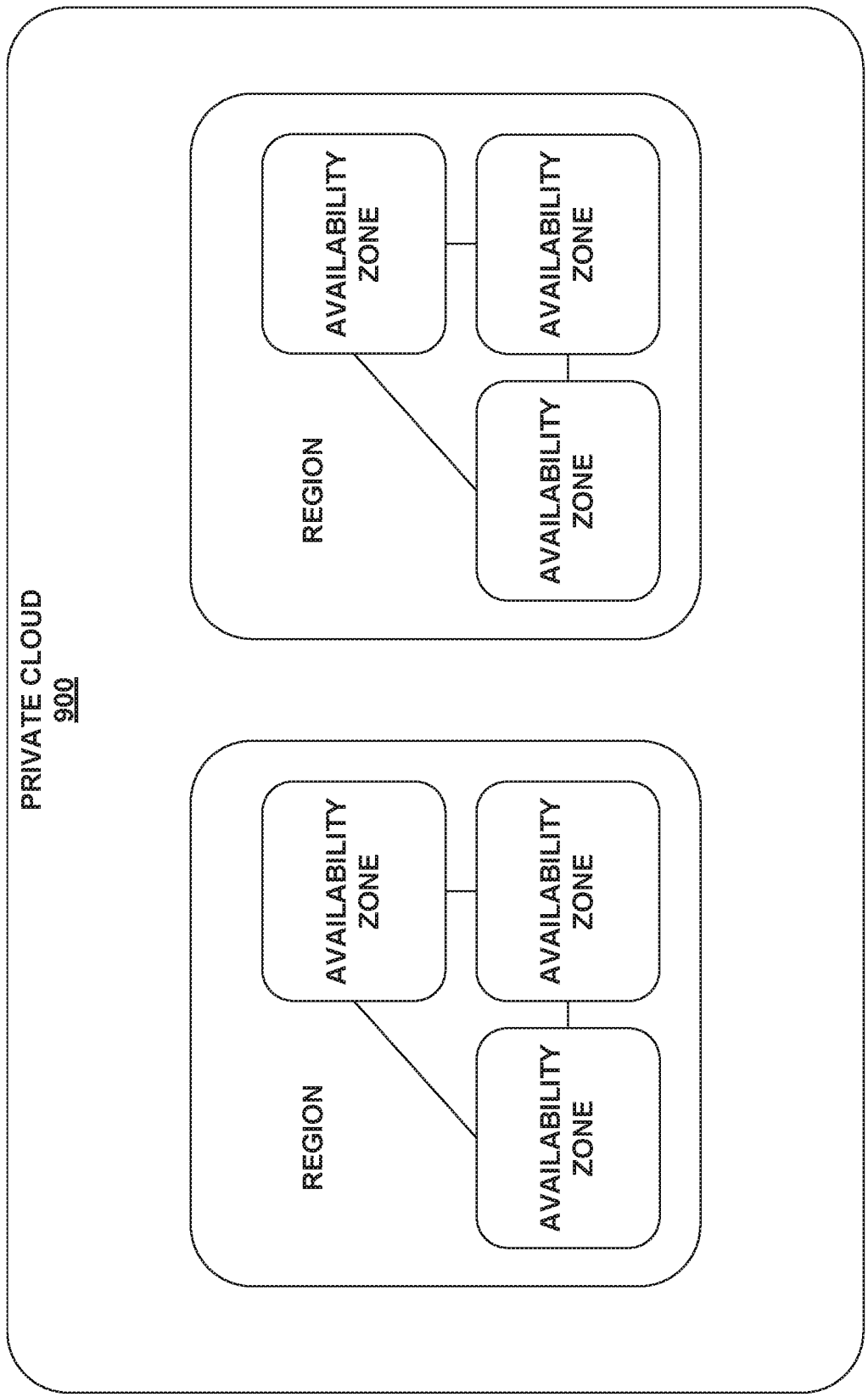
FIG. 9 is a block diagram illustrating an example private cloud including at least one region and at least one availability zone, according to techniques described in this disclosure.

FIG. 9 is a block diagram illustrating an example private cloud 900 including at least one region and at least one availability zone, according to techniques described in this disclosure. Each region of the at least one region includes a geographical area with a collection of availability zones mapped to physical data centers in the respective region. Every region of the at least one region is physically isolated from and independent of every other region of the at least one region in terms of location, power, water supply, etc. An availability zone is a logical data center in a region available for use by customer of private cloud 900. Each availability zone in a region has redundant and separate power, networking and connectivity to reduce the likelihood of two availability zones failing simultaneously.

Figure 10A:
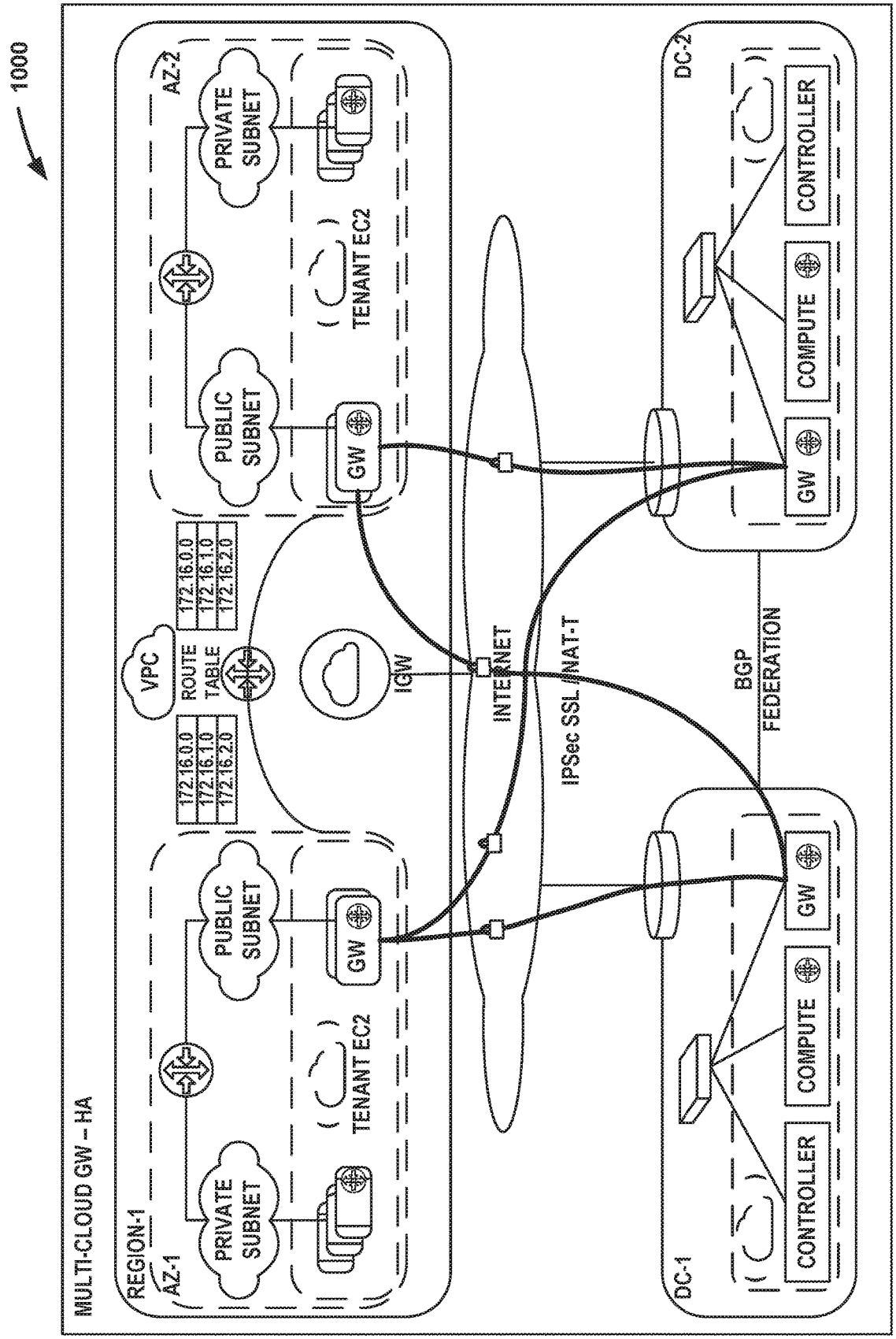
FIGS. 10A-10C are block diagrams illustrating an example system including at least one gateway unit, according to techniques described in this disclosure.
Figure 10B:
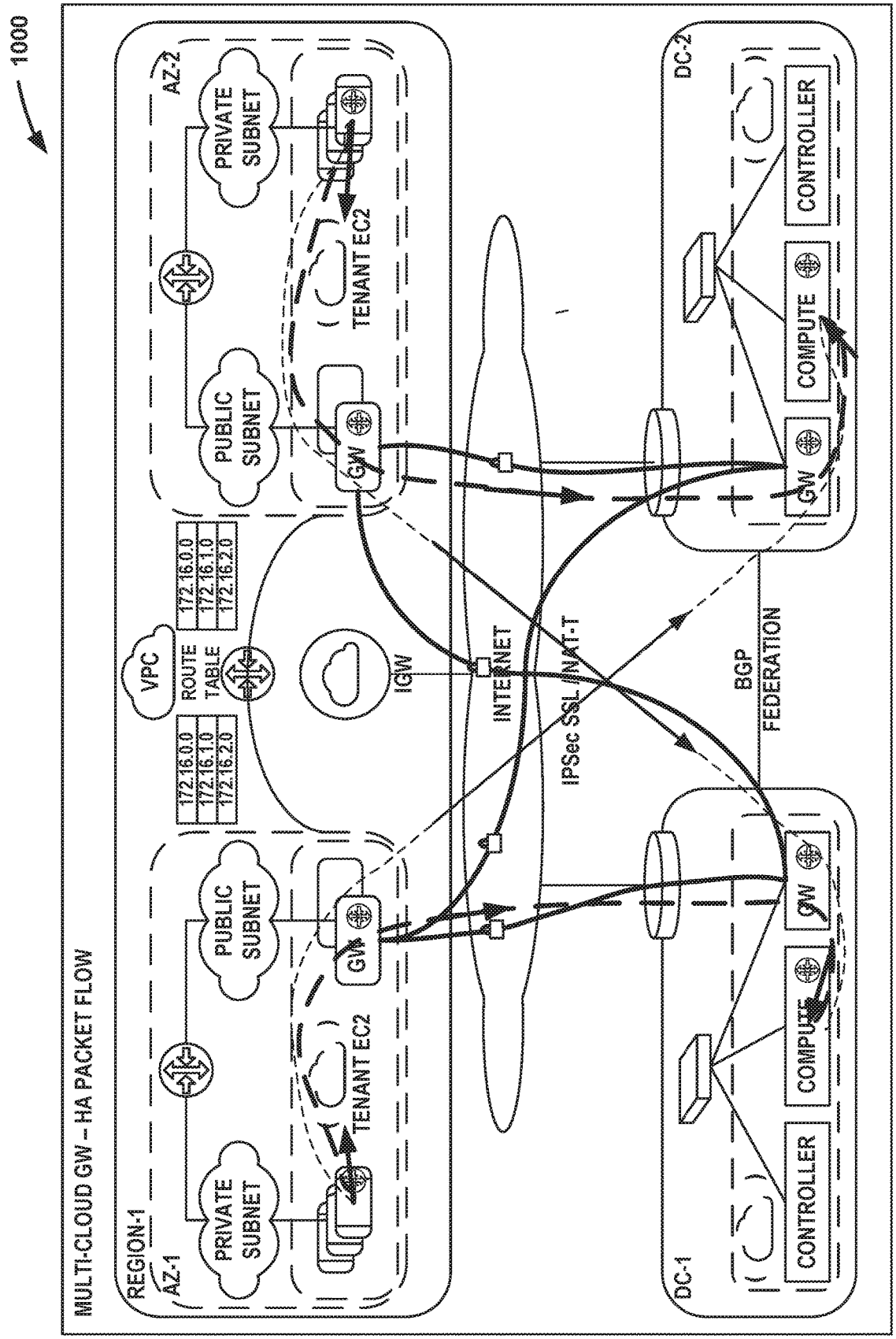
Figure 10C:
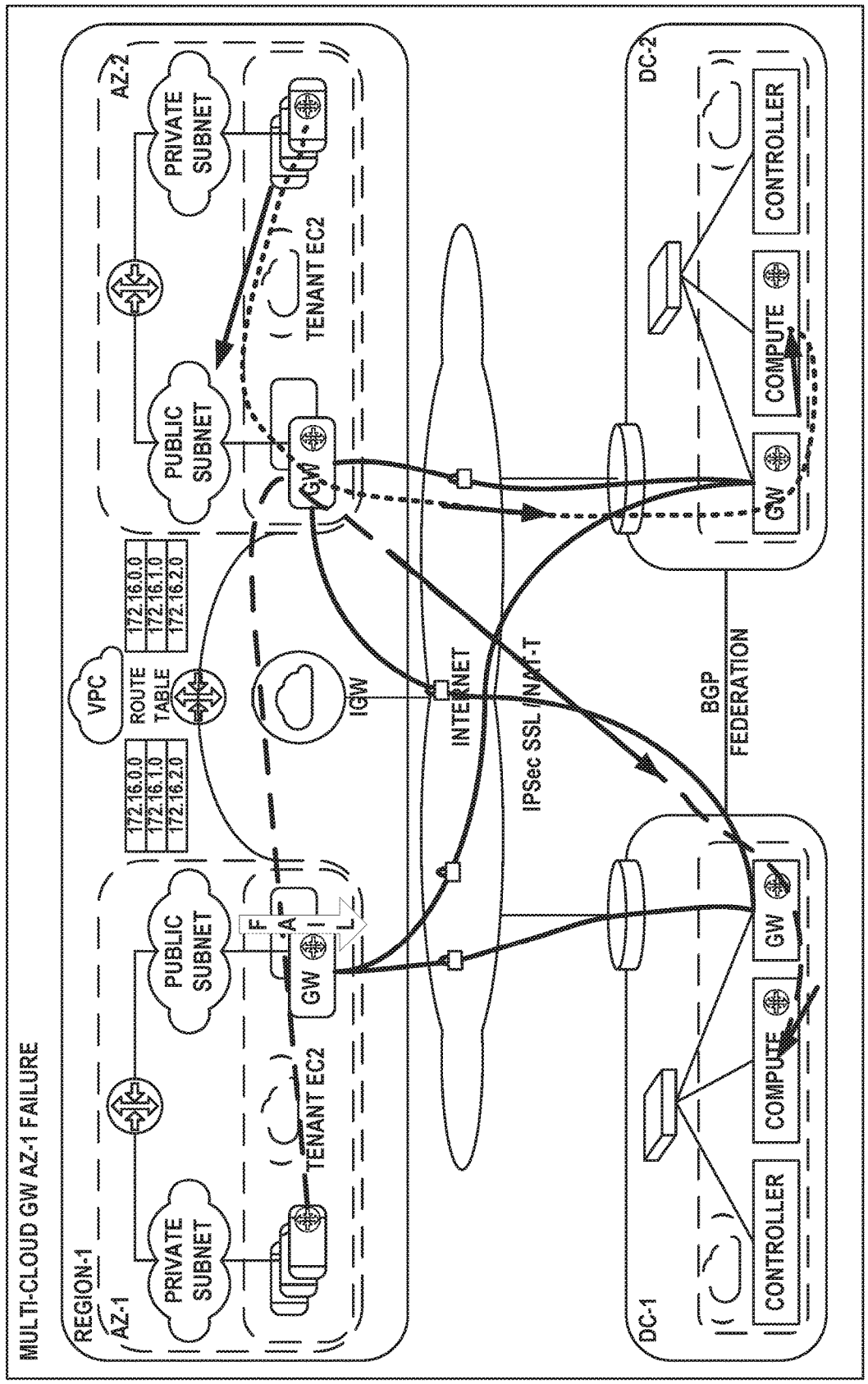

FIGS. 10A-10C are block diagrams illustrating an example network 1000 including at least one gateway portal, according to techniques described in this disclosure. Gateway portals may be located within each availability zone of network 1000. Additionally, controllers configured for building and monitoring computing infrastructures within availability zones including gateway portals. As seen in FIG. 10A, the gateway portals of the availability zones may be configured to communicate with the gateway portals of the controllers via an encrypted channel (an IPSec, a Secure Sockets Layer (SSL), or a network address translator traversal (Nat-t)). As seen in FIG. 10B, when each availability zone (e.g., AZ-1 and AZ-2) is functioning properly, tenant devices within an availability zone (e.g., AZ-1) are configured to transmit and receive information (e.g., packets, containers, or the like) with the controllers and tenant devices in another availability zone (e.g., AZ-2). If an availability zone such as AZ-1 goes offline (FIG. 10C), another availability zone such as AZ-2 may remain online and gateway portals may enable tenant devices within AZ-2 to exchange information with the controllers of DC-1 and DC-2.

In some examples, failures of availability zones may be handled by the gateway. For example, during an instance failure, gateway portals are deployed in active-standby pairs within each availability zone and DC-1 and DC-2. Gateway instance failures will have tunnel routes and next hops advertised to point to the current active gateway portal. In cases where both the gateway instances fail in an availability zone (e.g., AZ-1), then the routes to the gateway instances will be directed via the AZ-2 within the VPC.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    obtaining, by a computing device, a high-level topology description for a virtual computing environment to be provisioned in a plurality of computing infrastructures, wherein the high-level topology description includes a plurality of objects, wherein each computing infrastructure of the plurality of computing infrastructures is implemented using a different computing architecture of a plurality of computing architectures, and wherein each computing infrastructure of the plurality of computing infrastructures is deployed by a different provider of a plurality of providers;
    transforming, by a rules engine executing on the computing device, the high-level topology description to respective templates for the plurality of computing infrastructures, wherein each template of the plurality of templates describes a topology for a virtual computing environment in a format that conforms to a schema that can be processed by a corresponding one of the plurality of computing infrastructures to implement the virtual computing environment in the corresponding one of the plurality of computing infrastructures,
    wherein transforming the high-level topology description comprises:
        determining that a first object of the plurality of objects is an object for a first computing infrastructure of the plurality of computing infrastructures;
        in response to determining that the first object is an object for the first computing infrastructure, generating a first template of the plurality of templates for the first computing infrastructure of the plurality of computing infrastructures to include the first object for provisioning in the first computing infrastructure;
        determining that a second object of the plurality of objects is an object for a second computing infrastructure of the plurality of computing infrastructures; and
        in response to determining that the second object is an object for the second computing infrastructure, generating a second template of the plurality of templates for the second computing infrastructure of the plurality of computing infrastructures to include the second object for provisioning in the second computing infrastructure; and provisioning each of the plurality of computing infrastructures using the corresponding template of the plurality of templates to realize the virtual computing environment.

2. The method of claim 1,
wherein the high-level topology description for the virtual computing environment comprises a text file encoded with a human-readable data serialization language, and
wherein the high-level topology description for the virtual computing environment comprises at least one of virtual networks, storage, and services provided by the virtual computing environment.

3. The method of claim 2, wherein the human-readable data serialization language comprises YAML Ain't Markup Language (YAML).

4. The method of claim 1, wherein the method further comprises deploying one or more virtual execution elements to the virtual computing environment.

5. The method of claim 1,
wherein the topology defines one or more projects for each of the computing infrastructures, and
wherein each project of the one or more projects for a computing infrastructure define respective virtual private clouds to be provisioned in the computing infrastructures.

6. The method of claim 1, wherein obtaining the high-level topology description comprises obtaining the high-level topology description comprising a plurality of fields including at least one of a provider, an organization, a project, and at least one instance.

7. The method of claim 6, wherein the at least one instance comprises at least one of a name, a role, a provision, a username, an interface, a protocol, an availability zone, a machine ID, an instance type, a subnet, a security group, and a volume size.

8. The method of claim 1, wherein transforming the high-level topology description to the templates comprises creating, based on the high-level topology description, the respective templates, wherein an infrastructure as code (IaC) software is configured to implement the virtual computing environment in the selected one of the computing infrastructures using the templates.

9. The method of claim 8, wherein the IaC software comprises Terraform.

10. The method of claim 1, wherein the provider includes at least one of Amazon Web Services (AWS), Google Cloud Platform (GCP), and Microsoft Azure.

11. The method of claim 1,
wherein transforming the high-level topology description to the plurality of templates comprises transforming, based on a set of rules of the rules engine, the high-level topology description to the plurality of templates.

12. The method of claim 11, wherein transforming the high-level topology description to the plurality of templates based on the set of rules comprises:
applying, for a rule of the set of rules, a set of conditions to the high-level topology description,
determining, for each applied condition of the set of conditions, if the respective condition represents a success; and
in response to determining that at least one condition of the set of conditions represents a success, executing, using the computing device, an event corresponding to the rule of the set of rules.

13. The method of claim 12, wherein executing the event comprises:

identifying, in the high-level topology description, an object of the plurality of objects corresponding to a provider; and
placing the object in a template of the plurality of templates according to the provider corresponding to the object.

14. A computing system comprising:
one or more processors coupled to a memory, wherein the one or more processors are configured to:
obtain a high-level topology description for a virtual computing environment to be provisioned in a plurality of computing infrastructures, wherein the high-level topology description includes a plurality of objects, wherein each computing infrastructure of the plurality of computing infrastructures is implemented using a different computing architecture of a plurality of computing architectures, and wherein each computing infrastructure of the plurality of computing infrastructures is deployed by a different provider of a plurality of providers;
transform the high-level topology description to respective templates for the plurality of computing infrastructures, wherein each template of the plurality of templates describes a topology for a virtual computing environment in a format that conforms to a schema that can be processed by a corresponding one of the plurality of computing infrastructures to implement the virtual computing environment in the corresponding one of the plurality of computing infrastructures,
wherein to transform the high-level topology description, the one or more processors are configured to:
determine that a first object of the plurality of objects is an object for a first computing infrastructure of the plurality of computing infrastructures;
in response to determining that the second first object is an object for the first computing infrastructure, generating a first template of the plurality of templates for the first computing infrastructure of the plurality of computing infrastructures to include the first object for provisioning in the first computing infrastructure;
determine that a second object of the plurality of objects is an object for a second computing infrastructure of the plurality of computing infrastructures; and
in response to determining that the second object is an object for the second computing infrastructure, generate a second template of the plurality of templates for the second computing infrastructure of the plurality of computing infrastructures to include the second object for provisioning in the second computing infrastructure; and
provision each of the plurality of computing infrastructures using the corresponding template of the plurality of templates to realize the virtual computing environment.

15. The computing system of claim 14,
wherein the high-level topology description for the virtual computing environment comprises a text file encoded with a human-readable data serialization language, and
wherein the high-level topology description for the virtual computing environment comprises at least one of virtual networks, storage, and services provided by the virtual computing environment.

16. The computing system of claim 14, wherein the one or more processors are further configured to deploy one or more virtual execution elements to the virtual computing environment.

17. The computing system of claim 14, wherein to transform the high-level topology description to the plurality of templates, the one or more processors are configured to transform, based on a set of rules of a rules engine, the high-level topology description to the templates.

18. The computing system of claim 17, wherein to transform the high-level topology description to the plurality of templates based on the set of rules, the one or more processors are configured to:
- apply, for a rule of the set of rules, a set of conditions to the high-level topology description,
- determine, for each applied condition of the set of conditions, if the respective condition represents a success; and
- in response to determining that at least one condition of the set of conditions represents a success, execute an event corresponding to the rule of the set of rules.

19. The computing system of claim 18, wherein to execute the event, the one or more processors are configured to
- identify, in the high-level topology description, an object of the plurality of objects corresponding to a provider; and
- place the object in a template of the plurality of templates according to the provider corresponding to the object.

20. A non-transitory computer medium comprising instructions for causing one or more processors to:
- obtain a high-level topology description for a virtual computing environment to be provisioned in a plurality of computing infrastructures, wherein the high-level topology description includes a plurality of objects, wherein each computing infrastructure of the plurality of computing infrastructures is implemented using a different computing architecture of a plurality of computing architectures, and wherein each computing infrastructure of the plurality of computing infrastructures is deployed by a different provider of a plurality of providers;
- transform the high-level topology description to respective templates for the plurality of computing infrastructures, wherein each template the plurality of templates describes a topology for a virtual computing environment in a format that conforms to a schema that can be processed by a corresponding one of the plurality of computing infrastructures to implement the virtual computing environment in the corresponding one of the plurality of computing infrastructures, wherein to transform the high-level topology description, the instructions cause the one or more processors to:
  - determine that a first object of the plurality of objects is an object for a first computing infrastructure of the plurality of computing infrastructures;
  - in response to determining that the first object is an object for the first computing infrastructure, generating a first template of the plurality of templates for the first computing infrastructure of the plurality of computing infrastructures to include the first object for provisioning in the first computing infrastructure;
  - determine that a second object of the plurality of objects is an object for a second computing infrastructure of the plurality of computing infrastructures; and
  - in response to determining that the second object is an object for the second computing infrastructure, generate a second template of the plurality of templates for the second computing infrastructure of the plurality of computing infrastructures to include the second object for provisioning in the second computing infrastructure; and
- provision each of the plurality of computing infrastructures using the corresponding template of the plurality of templates to realize the virtual computing environment.

\* \* \* \* \*